United States Patent
Mondal et al.

(10) Patent No.: US 11,139,743 B2
(45) Date of Patent: Oct. 5, 2021

(54) ACCURATE FEED-FORWARD SENSING IN FLYBACK-TRANSFORMER BASED SECONDARY CONTROLLER

(71) Applicant: Cypress Semiconductor Corporation, San Jose, CA (US)

(72) Inventors: Partha Mondal, Paschim Medinipur (IN); Hemant P. Vispute, Bangalore (IN); Arun Khamesra, Bangalore (IN); Hariom Rai, Bangalore (IN); Pulkit Shah, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/883,890

(22) Filed: May 26, 2020

(65) Prior Publication Data

US 2020/0412266 A1  Dec. 31, 2020

Related U.S. Application Data

(63) Continuation of application No. 16/579,339, filed on Sep. 23, 2019, now Pat. No. 10,693,384, which is a
(Continued)

(51) Int. Cl.
*H02M 3/335* (2006.01)

(52) U.S. Cl.
CPC .... *H02M 3/33592* (2013.01); *H02M 3/33576* (2013.01)

(58) Field of Classification Search
CPC ......... H02M 3/33507; H02M 3/33515; H02M 3/33523; H02M 3/33561; H02M 3/33576;
(Continued)

(56) References Cited

U.S. PATENT DOCUMENTS

| 5,485,361 A | 1/1996 | Sokal |
| 6,381,152 B1 * | 4/2002 | Takahashi ............ H02H 7/1206 363/21.06 |

(Continued)

FOREIGN PATENT DOCUMENTS

| CN | 104901546 A | 9/2015 |
| CN | 108471239 A | 8/2018 |

(Continued)

OTHER PUBLICATIONS

USPTO Notice of Allowance for U.S. Appl. No. 16/740,189 dated Oct. 1, 2020, 9 pages.
(Continued)

*Primary Examiner* — Yemane Mehari

(57) ABSTRACT

An AC-DC converter with synchronous rectifier (SR) architecture and method for operating the same are described. Generally, a secondary side integrated circuit (IC) controller of the AC-DC converter includes a SR-SNS pin, a VBUS_IN pin, a first voltage-to-current converter, a sample-and-hold (S/H) circuit, a second voltage-to-current converter, and a signal generation circuit. The first voltage-to-current converter is coupled to remove a component of the output bus voltage sensed on the VBUS_IN pin from the voltage sensed on the SR-SNS pin. The S/H circuit is coupled to sample the voltage sensed on the SR-SNS pin and to provide a sampled voltage. The second voltage-to-current converter is coupled to convert the sampled voltage to a feed-forward current. The signal generation circuit is coupled to receive the feed-forward current and to generate feed-forward signals used to control operation of a primary side of the AC-DC converter.

20 Claims, 15 Drawing Sheets

Related U.S. Application Data continuation-in-part of application No. 16/453,705, filed on Jun. 26, 2019, now Pat. No. 10,554,140.

(60) Provisional application No. 62/894,440, filed on Aug. 30, 2019.

(58) Field of Classification Search
CPC ...... H02M 3/33592; H02M 1/32; H02M 1/36; H02M 2001/0032; H02M 7/48; H02M 7/51; Y02B 70/1475
USPC .... 363/21.04, 21.06, 21.09, 21.1, 21.14, 55, 363/97
See application file for complete search history.

(56) References Cited

U.S. PATENT DOCUMENTS

| | | |
|---|---|---|
| 6,456,511 B1 | 9/2002 | Wong |
| 6,504,267 B1* | 1/2003 | Giannopoulos ... H02M 3/33561 307/31 |
| 6,671,189 B2 | 12/2003 | Jansen et al. |
| 8,581,505 B2 | 11/2013 | Melanson |
| 8,792,257 B2 | 7/2014 | Berghegger |
| 8,964,420 B2* | 2/2015 | Zhang ............... H02M 3/33592 363/21.12 |
| 9,093,903 B2 | 7/2015 | Swaminathan et al. |
| 9,325,246 B1 | 4/2016 | Peng et al. |
| 9,379,625 B2 | 6/2016 | Kesterson et al. |
| 9,502,985 B2 | 11/2016 | Werner et al. |
| 9,998,014 B2 | 6/2018 | Yao et al. |
| 10,554,140 B1 | 2/2020 | Khamesra et al. |
| 2009/0268494 A1 | 10/2009 | Hu |
| 2010/0027298 A1* | 2/2010 | Cohen ............... H02M 3/33592 363/21.14 |
| 2012/0250366 A1* | 10/2012 | Wang ................ H02M 3/33523 363/21.15 |
| 2014/0078788 A1 | 3/2014 | Yao et al. |
| 2014/0204624 A1 | 7/2014 | Djenguerian et al. |
| 2014/0254202 A1 | 9/2014 | Balakrishnan et al. |
| 2015/0103567 A1* | 4/2015 | Wang ................ H02M 3/33592 363/21.13 |
| 2015/0280573 A1 | 10/2015 | Gong et al. |
| 2016/0111961 A1 | 4/2016 | Balakrishnan et al. |
| 2016/0359421 A1* | 12/2016 | Lin .................... H02M 3/33592 |
| 2017/0033698 A1* | 2/2017 | Vemuri ............. H02M 3/33592 |
| 2018/0159434 A1 | 6/2018 | Werner et al. |
| 2018/0351462 A1* | 12/2018 | Li ..................... H02M 3/33507 |
| 2018/0358902 A1* | 12/2018 | Duvnjak ........... H02M 3/33592 |
| 2019/0149056 A1 | 5/2019 | Zheng et al. |

FOREIGN PATENT DOCUMENTS

| | | |
|---|---|---|
| CN | 105680694 B | 7/2019 |
| JP | 6336784 B2 | 6/2018 |
| WO | 2009010802 A2 | 1/2009 |
| WO | 2018213015 A1 | 11/2018 |
| WO | 2019026706 A1 | 2/2019 |

OTHER PUBLICATIONS

"UCC24630 Synchronous Rectifier Controller With Ultra-Low-Standby Current" Texas Instruments, Mar. 2015, pp. 1-41; 41 pages.

USPTO Non-Final Rejection for U.S. Appl. No. 16/453,705 dated Aug. 21, 2019, 5 pages.

USPTO Non-Final Rejection for U.S. Appl. No. 16/455,568 dated Aug. 22, 2019, 9 pages.

USPTO Notice of Allowance for U.S. Appl. No. 16/453,705 dated Oct. 3, 2019, 10 pages.

USPTO Notice of Allowance for U.S. Appl. No. 16/455,568 dated Mar. 4, 2020; 9 pages.

USPTO Notice of Allowance for U.S. Appl. No. 16/455,568 dated Nov. 29, 2019; 9 pages.

USPTO Notice of Allowance for U.S. Appl. No. 16/578,707 dated Feb. 3, 2020; 9 pages.

USPTO Notice of Allowance for U.S. Appl. No. 16/579,339 dated Feb. 10, 2020; 9 pages.

USPTO Non-Final Rejection for U.S. Appl. No. 16/849,775 dated May 3, 2021; 10 pages.

USPTO Notice of Allowance for U.S. Appl. No. 16/849,735 dated May 6, 2021; 8 pages.

USPTO Notice of Allowance for U.S. Appl. No. 16/849,770 dated Aug. 16, 2021; 9 pages.

CNIPA Office Action for Application No. 202010576308.6 dated Jul. 14, 2021; 5 pages.

* cited by examiner

ACCURATE FEED-FORWARD SENSING IN FLYBACK-TRANSFORMER BASED SECONDARY CONTROLLER

CROSS-REFERENCE TO RELATED APPLICATIONS

The present application is a continuation application of U.S. Non-Provisional application Ser. No. 16/579,339, filed on Sep. 23, 2019, which is a continuation-in-part of U.S. Non-Provisional application Ser. No. 16/453,705, entitled AC-DC Converter with Secondary Side-Control and Synchronous Rectifier Sense Architecture, filed on Jun. 26, 2019, now U.S. Pat. No. 10,554,140, issued on Feb. 4, 2020, and claims the benefit of priority under 35 U.S.C. 119(e) to U.S. Provisional Patent Application No. 62/894,440, filed on Aug. 30, 2019, all of which are incorporated by reference herein in their entirety.

TECHNICAL FIELD

This disclosure relates generally to AC-DC power converters, and more particularly to AC-DC converters including a secondary side controller and synchronous rectifier sense architecture and methods of operating the same.

BACKGROUND

AC-DC converters convert power from an alternating current (AC) source to a direct current (DC) at a specified voltage level. AC-DC converters using secondary side control can deliver power more efficiently for a given size and weight, and are therefore widely used in portable electronic devices. Generally, an AC-DC converter transfers power from an AC input connected or coupled to a primary side of a transformer to a DC output coupled to a secondary side of the transformer.

A simplified schematic block diagram of one such AC-DC converter including a synchronous rectifier (SR) sense architecture is shown in FIG. 1. Referring to FIG. 1 the AC-DC converter 100, generally includes a rectifying circuit, such as a bridge rectifier 101, coupled to a transformer 102 rectify an AC input voltage, an active rectification element or power switch (PS), such as a PS field effect transistor (PS_FET 104) on a primary side of the transformer, a synchronous rectifier (SR), such as a SR field effect transistor (SR_FET 106) on a secondary side of the transformer, and an output filter or capacitor 108. In operation the PS_FET 104 switches power to the primary side on or off in response to a signal from a primary side controller 110. In secondary side controlled converters a secondary side controller 112 coupled to a drain node (SR_DRAIN 114) and gate of the SR_FET 106 senses voltage on the SR_DRAIN and turns the SR_FET on and off in response to sensed voltage peaks, and negative and zero-crossings.

In a flyback AC-DC converter, the primary side controller 110 receives a signal from the secondary side controller 112 over a feedback or flyback path 116. During the time in which the PS_FET 104 is on or closed with SR_FET 106 being off or open, the AC-DC converter 100 is said to be operating in fly-back mode, and a magnetic field builds up in the transformer 102 while a current on the primary side increases linearly. When the PS_FET 104 is off or opened, and SR_FET 106 is on or closed, the AC-DC converter 100 transfers the power to secondary side, in which the magnetic field begins to collapse and the secondary side current decreases steadily, but gradually as power is given to the Cout 108 connected to the output until a point is reached at which there is substantially zero current flow in the secondary.

One problem with previous generations of AC-DC converters using SR-SNS architecture is that depending on the turn-ratio (N:1) of the transformer 102 (typically 4:1), a voltage on the drain node 114 of the SR_FET 106 can go beyond the 1/Nth of rectified AC input voltage, often as high as 115V for 230V AC input. This in turn requires the use of a relatively large and expensive high-voltage FETs on SR_DRAIN node as well as additional electrostatic discharge (ESD) circuitry in the secondary side controller 112 to safely couple this voltage from the drain node 114 to the secondary side controller.

Prior approaches to at least partially addressing the above problem rely on use of a large, high power FET made with greater than 150V tolerant technology to sense SR_DRAIN node inside Secondary Controller 112 or use of external clamping circuits 118 to clip the input to the secondary side controller 112. These approaches have not been wholly satisfactory as the secondary side controller 112 is often realized as an integrated circuit (IC), and the use an external clamping circuit 118 to clip the input to the IC requires additional package pins and external components and connections for peak-detecting and feed-forward (feed-fwd) sensing because externally clipping the voltage on the SR_DRAIN 114 interferes with these detections. Thus, use of external clamping circuits 118 increases both the size and complexity of the IC and the number of package-pins of the IC dedicated to SR sensing. This in turn increases the bill of materials (BOM) needed for manufacturing the AC-DC converter 100 and the size of the IC on which the secondary side controller 112 is fabricated, both of which tend to increase cost while decreasing yield and utility of the AC-DC converter 100 in applications requiring compact power converters.

Another problem with previous generations of AC-DC converters 100, and secondary side controlled AC-DC converters in, arises due to requirement of detection of a valley or minimum voltage on the primary. In AC-DC converters 100 the PS_FET 104 should be turned on at the valley to minimize conduction loss and thereby achieve optimal efficiency. However, in secondary side controlled AC-DC converters 100, such as shown in FIG. 1, because the valley on the primary is detected as a peak on secondary side, which corresponds to a peak on secondary, detection of the peak needs to be done accurately. This additional requirement of peak detection results in additional components to be added on SR_DRAIN node, as the external clamping circuit 118 will not allow peaks on SR_DRAIN to be sensed accurately. Hence, additional component is required to be added on SR_DRAIN 114 for example Cpd is added in AC-DC converter 100, shown in FIG. 1 Thus, use of external peak-detect component (Cpd) increases both the size and complexity of the IC and the number of package-pins of the IC dedicated to SR sensing. This in turn increases the bill of materials (BOM) needed for manufacturing the AC-DC converter 100 and the size of the IC on which the secondary side controller 112 is fabricated, both of which tend to increase cost while decreasing yield and utility of the AC-DC converter 100 in applications requiring compact power converters. Consequently, with previous generations of AC-DC converters 100, it is not possible to hit the valley accurately resulting in loss of efficiency.

Accordingly, there is a need for an AC-DC converter with secondary side control and SR-SNS architecture and methods for operating the same that reduces cost and complexity without affecting performance. There is a further need for an AC-DC converter with secondary side control and SR-SNS architecture and methods for operating the same that provides accurate feed-forward sensing for improved efficiency.

SUMMARY

AC-DC converters with secondary side control and synchronous rectifier (SR) architecture and methods of operating the same are provided for reducing the cost, complexity and size of the converter while improving efficiency.

In one embodiment, the secondary side controller includes a single synchronous rectifier sense (SR-SNS) pin coupled to a drain of the synchronous rectifier (SR) on a secondary side of a transformer in the converter to sense a voltage (VSRD) on the drain. Generally, the secondary side controller further includes a VBUS voltage-to-current (V2I) converter coupled to the SR-SNS pin when the converter is operating in the FF mode and to an output bus on the secondary side, a sample and hold (S/H) circuit or module also coupled to the SR-SNS pin and a VIN/N V2I converter coupled to the S/H module, and a turn ratio (N) cancellation and signal circuit or module coupled to the VIN/N V2I converter. When the converter is operating in a feed-forward (FF) mode VSRD is a sum of a voltage (VIN) applied to a primary side of the transformer divided by the N of the transformer and a voltage (VBUS) on an output bus coupled to the secondary side. The VBUS V2I converter is configured to remove from a voltage (VSR-SNS) on the SR-SNS pin a component of VSRD arising from VBUS. The S/H module is configured to sample and hold a voltage (VSAMP) comprising information on VIN/N, and the VIN/N V2I converter is configured to convert VSAMP to a feed-forward current (IFF) comprising information on VIN/N. Finally, the N cancellation and signal module is configured to extract from the IFF information on VIN and generate FF signals used by the secondary side controller to control the converter.

In some embodiments the SR-SNS pin is one pin of an integrated circuit (IC) on which are also integrally formed the VBUS V2I converter, the S/H module, the VIN/N V2I converter and the N cancellation and signal module. Preferably, the single SR-SNS pin is coupled to the drain of the SR through a voltage divider including elements both internal and external to the IC. More preferably, the elements of the voltage divider includes an external resistive element (Rext) having a resistance based on VIN and N to provide a maximum input voltage to the single SR-SNS pin of less than 21.5V.

In another aspect or embodiment, a method of operating a secondary side controller for a converter is provided. Generally, the method begins with coupling the VSRD on the drain of the SR to the single SR-SNS pin when the converter is operating in FF mode. Next, a voltage (VSR-SNS) is sensed on the SR-SNS pin. The component of VSRD arising from VBUS is then removed from the VSR-SNS on the SR-SNS pin. A voltage (VSAMP) from the SR-SNS pin, which includes information on VIN/N, is then sampled and held. The VSAMP is then converted to a feed-forward current (IFF) comprising information on VIN/N. Finally, information on VIN is extracted from the IFF and FF signals generated for use by the secondary side controller to control the converter in FF mode.

In one embodiment, removing the component of $V_{SRD}$ arising from $V_{BUS}$ includes sinking a current ($I_{VBUS}$) drawn through an external resistance element (Rext) between the SR-SNS pin and SR drain to remove from $V_{SR\text{-}SNS}$ the component of $V_{SRD}$ arising from $V_{BUS}$. In another embodiment, sensing $V_{SR\text{-}SNS}$ on the SR-SNS pin includes converting $V_{SR\text{-}SNS}$ to a current substantially equivalent to that necessary to generate $V_{SR\text{-}SNS}$ across a resistance equal to Rext, and removing the component of $V_{SRD}$ arising from $V_{BUS}$ includes subtracting from $I_{FF}$ a current substantially equivalent to a current capable of generating $V_{BUS}$ across Rext.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

Figure 1:
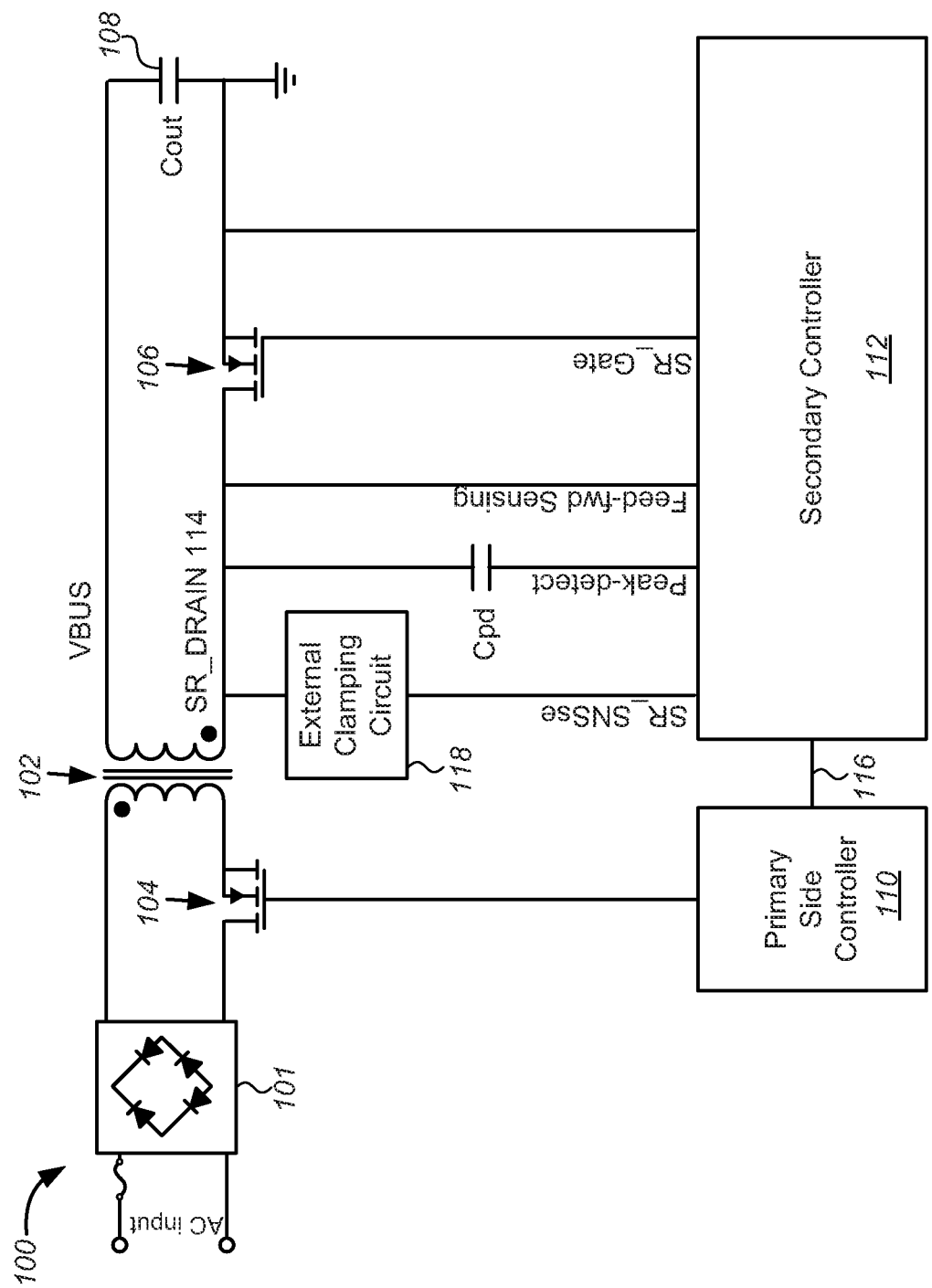
FIG. 1 is a schematic block diagram illustrating an AC-DC converter for which a secondary-side controller and synchronous rectifier (SR) architecture of the present disclosure is particularly useful.

The features and advantages of embodiments of the present invention will become more apparent from the detailed description set forth below when taken in conjunction with the drawings. In the drawings, like reference numbers generally indicate identical, functionally similar, and/or structurally similar elements.

DETAILED DESCRIPTION

AC-DC converters with secondary side control and synchronous rectifier (SR) architecture including a single SR-SNS pin (SR_SNS) and methods of operating the same are disclosed for reducing the cost, complexity and size of the converter while improving efficiency. The system and methods of the present disclosure are particularly useful in or with flyback AC-DC converters to improve valley detection for improved control of a primary side power switch or primary FET by a secondary side controller to improve efficiency of the converter.

Figure 2A:
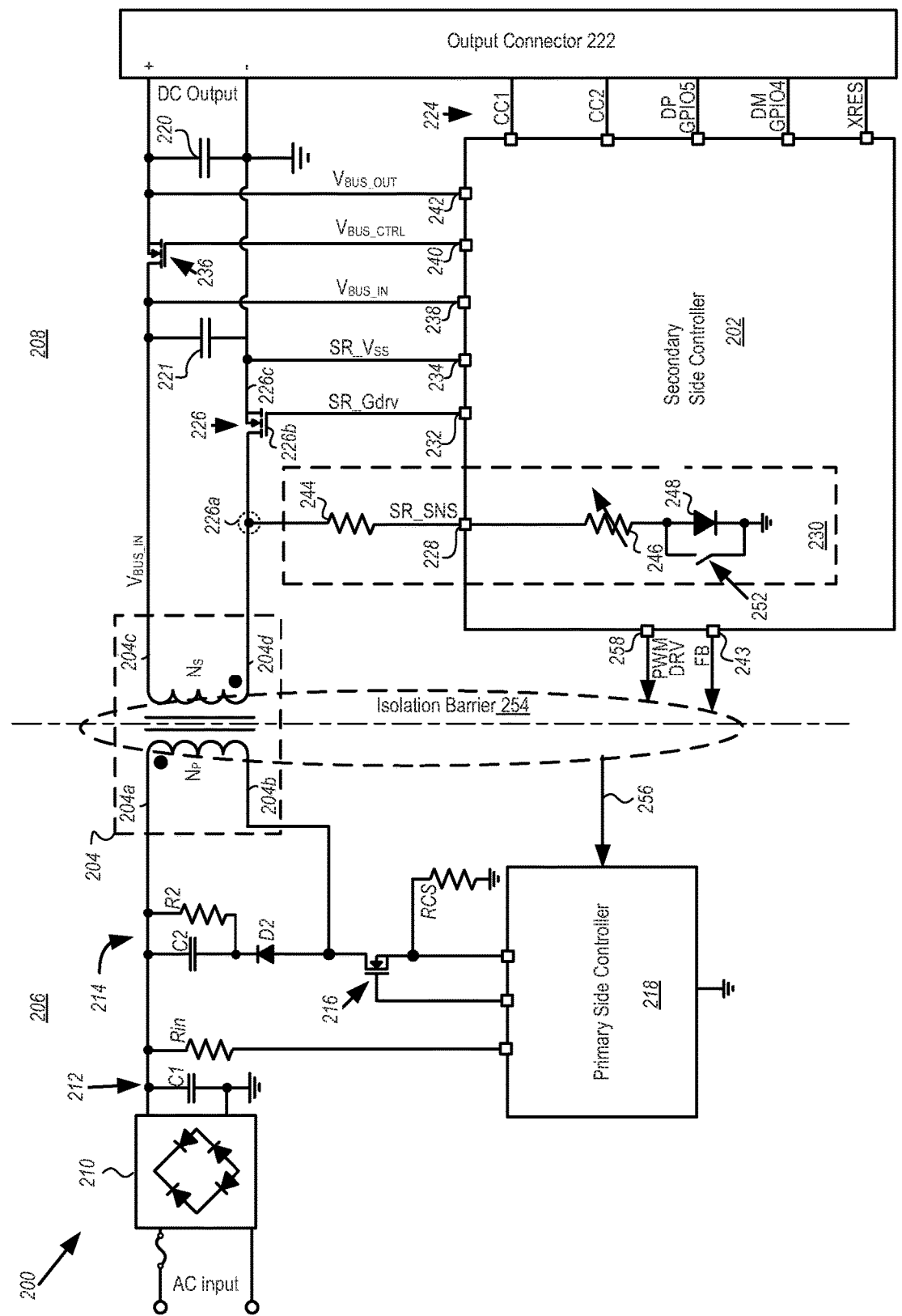
FIG. 2A is a schematic block diagram depicting an embodiment of an AC-DC converter including a secondary-side controller and SR architecture in accordance with the present disclosure.

An embodiment of an AC-DC converter including a secondary-side controller and SR architecture in accordance with the present disclosure will now be described with reference to FIGS. 2A through 2E. FIG. 2A is a schematic block diagram of an AC-DC converter 200 including an embodiment of a secondary-side controller 202 and having an SR architecture in accordance with the present disclosure. Referring to FIG. 2A, the AC-DC converter 200 generally includes a transformer 204 having a primary winding (NP) on a primary side 206 electrically connected or coupled to an AC input, and a secondary winding (NS) on a secondary side 208 coupled to a DC output.

On the primary side 206 a rectifying circuit, such as a bridge rectifier 210, and one or more input filters 212, 214, coupled to a first terminal 204a of the transformer 204 rectify an AC input voltage and supply input power to the primary winding of the transformer 204. The input filters can include a first input filter 212 having a capacitor (C1) coupled to or across an output of the rectifier 210, and a second, RC filter 214 including a resistor or resistive element (R2) and a capacitor (C2) coupled in parallel between the first terminal 204a of the transformer 204 and a cathode of a diode or rectifier (D2) having an anode coupled to a second terminal 204b of the transformer. Generally, as in the embodiment shown, the AC-DC converter 200 further includes a power switch (PS 216), such as a primary field effect transistor (PR_FET), having a first or drain node coupled to the second terminal 204b of the transformer 204, a second or gate node coupled to a primary side controller 218, and a third or source node coupled to the primary side controller and, through a current sensing element, such as a resistive element (RCS) to ground to sense a primary side current (I_primary) flowing through the primary winding when the PS 216 is closed or conducting. Generally, as in the embodiment shown, the primary side controller 218 is further coupled to the first terminal 204a of the transformer 204 through a resistive element (Rin) to receive a voltage or signal equal or proportional to the rectified AC input voltage.

On the secondary side 208 the AC-DC converter 200 includes a filter capacitor 221 coupled between a third terminal 204c of the transformer 204 and an electrical ground or ground terminal, and an output capacitor 220 coupled between a third terminal 204c of the transformer 204 and an electrical ground provide a DC output voltage to an output interface or connector 222. Generally, as in the embodiment shown the output connector 222 is further coupled to the secondary side controller 202 through a number of communication channels 224 to support various charging protocols. Suitable output connectors 222 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector can include a Universal Serial Bus type C (USB-C) compatible connector where the AC-DC converter 200 is compliant with the USB protocol to provide a DC output voltage of about 3.3 VDC to about 21.5 VDC at a current of from about 0 to about 3000 milliamps (mA).

In accordance with the present disclosure, the AC-DC converter 200 further includes on the secondary side 208 a synchronous rectifier (SR 226), such as a synchronous rectifier field effect transistor (SR_FET), coupled between a fourth terminal 204d of the transformer 204 and the ground terminal of the DC output. The SR 226 includes a first or drain node 226a coupled to the fourth terminal 204d of the transformer 204 and the secondary side controller 202 to sense a voltage on the drain of the SR; a second or gate node 226b coupled to the secondary side controller to drive or control the SR; and a third or source node 226c coupled to the secondary side controller and the ground terminal of the DC output.

In certain embodiments, such as that shown, the secondary side controller 202 is realized or implemented as single integrated circuit (IC), or as a number of ICs packaged in a single IC package, and the drain node 226a is coupled to a single SR-SNS pin 228 of the IC through a voltage divider 230 including circuit elements both internal and external to the IC of the secondary side controller. The gate node 226b of the SR 226 is coupled to the secondary side controller 202 through a SR-drive pin 232, and the source node 226c of the SR is coupled to the secondary side controller through a SR-Vss (ground voltage level) pin 234.

Optionally, as in the embodiment shown, the secondary side further includes an additional or secondary switch (SS) 236, such as a NFET, coupled between the third terminal 204c of the transformer 204 and a positive DC output to enable to the secondary side controller 202 to turn off the DC output to protect against over voltage and/or under voltage conditions. The SS 236 includes a drain node coupled to a voltage bus in pin ($V_{BUS\_IN}$) 238 of the secondary side controller 202; a gate node coupled to a voltage bus control pin ($V_{BUS\_CTRL}$) 240 to drive or control the SS; and a source node coupled to a voltage bus out pin ($V_{BUS\_OUT}$) 242 and to the positive terminal of the DC output.

The voltage divider 230 includes an external resistive element 244, an internal resistive element 246 and an internal rectifier 248. Although shown schematically as a diode, it will be understood that this need not be the case in every embodiment, and that internal rectifier 248 may be a PN diode (as shown), or alternatively, a synchronous diode or a FET configured or connected to function as a diode. The configuration or placement of the internal rectifier 248, i.e., connected with a cathode to ground, ensures that during negative sensing or zero-crossing operations there is substantially no current flow through the voltage divider 230, thereby allowing the full, undivided negative voltage on the drain node 226a to be coupled to the SR-SNS pin 228. A resistance value of external resistive element 244 is generally fixed by the manufacturer of the AC-DC converter 200 and is selected based on an expected maximum voltage on the drain node 226a based on the maximum AC voltage input, and turn-ratio of the transformer 204 to limit a maximum voltage on the SR_SNS node 228 to enable the secondary side controller 202 to be a made with non-high voltage devices, made using standard, low voltage technologies. Suitable values for the resistance of the resistive element 244 are from about 4KΩ to about 10KΩ. For example in one embodiment in which the maximum input voltage after bridge rectifier 210 is 380V and the transformer 204 has a 4:1 turn ratio, and the voltage of 21.5V DC on VBUS_IN, the SR_DRAIN 226a voltage can be 116.5V. Secondary side controller 202 is fabricated using a 20V tolerant technology, and the external resistive element 244 has a resistance of about 10KΩ and internal resistance of about 2KΩ to limit the maximum voltage on the drain node 226a to no more than about 21.5V.

The internal resistive element 246, shown schematically as a variable resistance in FIG. 2A, can have a resistance value set by the manufacturer at the time the AC-DC converter 200 is manufactured based on either desired input or output voltages, or to compensate for variations in parameters of the IC or other components in the AC-DC converter. Alternatively, the resistance value of the internal resistive element 246 can be dynamically adjusted by a calibration circuit in the AC-DC converter 200 or secondary side controller 202, either at start-up or powering on of the AC-DC converter, or periodically thereafter.

Optionally, as in the embodiment shown, the voltage divider 230 further includes a bypass switching element or switch 252 in parallel the internal rectifier 248. The switch 252 is closed during feed-forward (ff) sensing in response to an ff-signal (ff_enable) generated in the secondary side controller 202 upon detection of an increasing or non-zero positive voltage on the drain node 226a, which indicates a feed-forward operation. It is noted that although in the embodiment shown in FIG. 2A the internal rectifier 248 and the switch 252 are shown schematically as two separate and distinct elements, this need not be the case in every embodiment, and the rectifier and switch may alternatively include a single device, such as a FET, in which the switch is formed by the FET and the rectifier is formed by an intrinsic body diode between a source and drain of the FET.

As shown in FIG. 2A, the AC-DC converter 200 further includes an isolation circuit or barrier 254 to electrically isolate the secondary side 208 from the high AC input voltage present on the primary side 206. Because the transformer 204 is a step down transformer it is generally considered part of the isolation barrier 254. Additionally where, as in the embodiment shown, the AC-DC converter 200 is a flyback converter in which a signal 256 is provided to the primary side controller 218 from pins on the secondary side controller 202, such as a feedback pin 243 or pulse width modulation (PWM) drive pin 258, the isolation barrier 254 can further include additional circuits or elements between the secondary side controller and the primary side controller 218 or PS 216. Details of these additional circuits or elements according to various embodiments are described below with reference to FIGS. 2C and 2D.

Figure 2B:
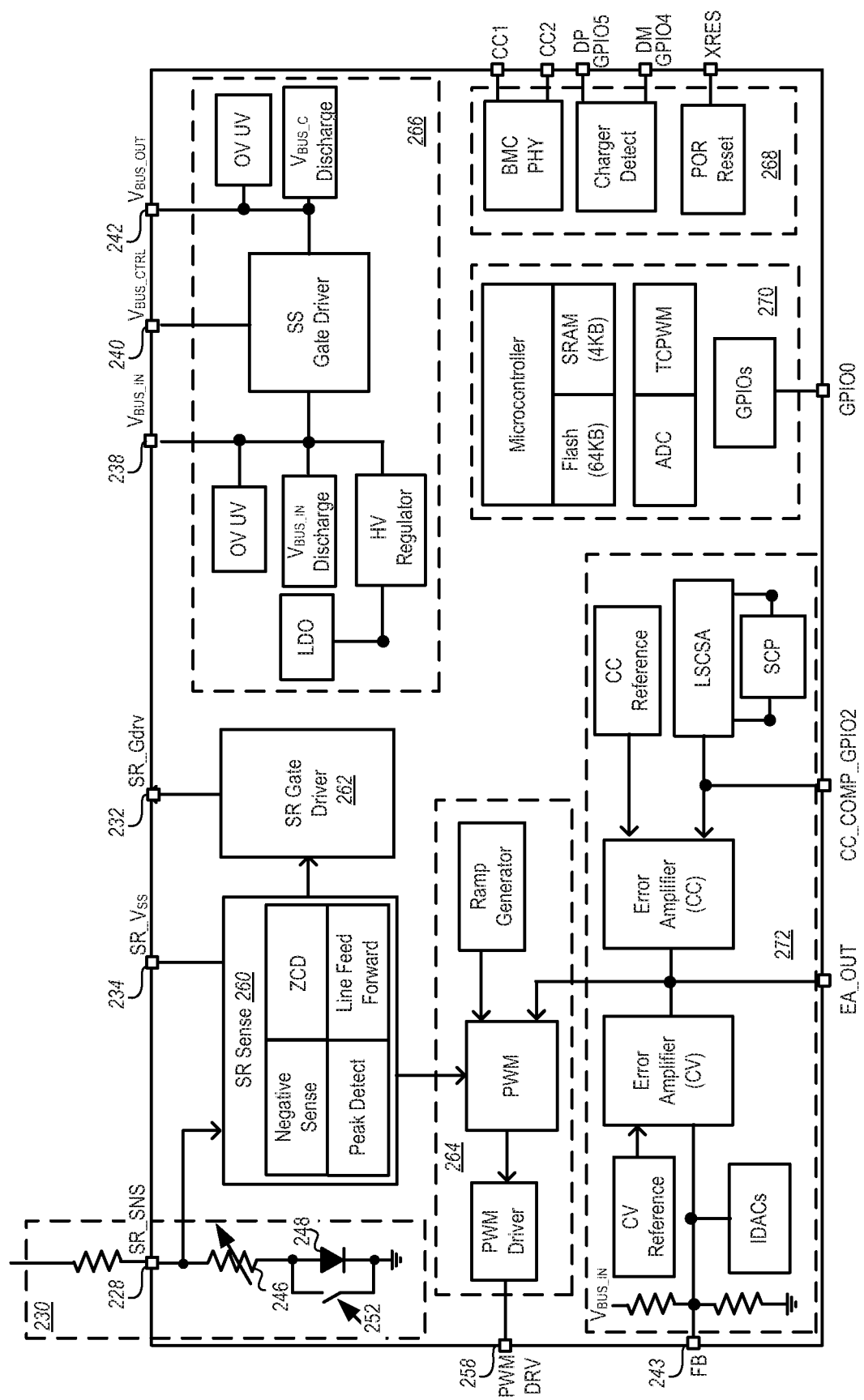
FIG. 2B is a detailed block diagram depicting an embodiment of the secondary-side controller of FIG. 2A in accordance with the present disclosure.

FIG. 2B is a detailed block diagram depicting an embodiment of the secondary-side controller 202 of FIG. 2A. Referring to FIG. 2B, in addition to the voltage divider 230 the secondary-side controller 202 generally further includes an SR sense circuit or block 260 and a SR gate driver circuit or block 262 coupled to the gate node 226b of the SR 226 through the SR-drive pin 232. The SR sense block 260 is coupled to the drain node 226a of the SR 226 through the single SR-SNS pin 228 and the voltage divider 230 and through the SR-Vss pin 234 to the source node 226c of the SR. The SR sense block 260 generally includes a zero-crossing detector (ZCD) block, a negative-sensing (NSN) block, a peak-detector (PKD) block, and a line-feed-forward (LFF) block for sensing a voltage on the drain 226a of the SR 226 to sense or detect a zero-crossing, a negative voltage, a peak (positive) voltage and a feed-forward operation. One or more outputs of the SR sense block 260 are coupled to the SR gate driver block 262 to control the SR 226 and to a pulse width modulation (PWM) circuit 264 to provide a signal 256 through the PWM drive pin 258 to the primary side controller 218 to control the PS 216. The PWM circuit 264 includes a ramp generator and PWM for generating a signal having a modulated pulse width, and a PWM driver for boosting a voltage or power of the signal to that necessary for driving the primary side controller 218 or PS 216.

As shown in FIG. 2B, the secondary side controller 202 further includes a secondary switch (SS) circuit 266. The SS circuit 266 includes OV-UV circuits or blocks for detection over voltage (OV) and under voltage (UV) conditions on $V_{BUS\_IN}$ 238 and $V_{BUS\_OUT}$ 242; low dropout (LDO) and high voltage (HV) regulators; and discharge circuits or blocks for discharging $V_{BUS\_IN}$ and $V_{BUS\_OUT}$.

An interface circuit 268 switch includes circuits or blocks for communicating with a device being powered or charged by the AC-DC converter 200 to support various charging protocols. These circuits or blocks can include a Biphase Mark Code (BMC) physical layer (PHY) to communicate with device using certain charging protocols, a charger detect block and a power on reset (POR) block to reset the device, putting it into a known state on initiation of charging by the AC-DC converter 200.

The secondary side controller 202 further includes a microcontroller unit (MCU) subsystem 270 including logic a microprocessor or controller for executing programs stored memory in the MCU subsystem; analog-to-digital converters (ADC); a multipurpose Timer Counter Pulse Width Modulator (TCPWM) capable of performing a multiple functions necessary for operation of the MCU; and a number of general purpose input/outputs (GPIOs), only one of which is shown.

Lastly, the secondary side controller 202 further includes a feedback circuit or circuit 272 coupled to the feedback pin 243 to provide error correction to the PWM circuit 264, and, in certain embodiments of the isolation barrier 254 to provide a feedback signal to the primary side controller 218. Generally, as in the embodiment shown circuit 272 includes a constant voltage (CV) reference, a constant current (CC) reference, one or more error amplifiers and inter-digital analog converters (IDACs), a low-side current sense amplifier (LSCSA), and a short circuit protection (SCP) block.

Embodiments of the isolation barrier 254 of the AC-DC converter 200 of FIG. 2A will now be described with reference to FIGS. 2C and 2D. It is noted that FIGS. 2C and 2D each illustrate one exemplary embodiments of the isolation barrier 254, and that other embodiments of the isolation barrier can be implemented that may or may not include all elements and components shown in these figures. Thus, the embodiments of FIGS. 2C and 2D are not intended to limit the present invention and the appended claims in any way.

Figure 2C:
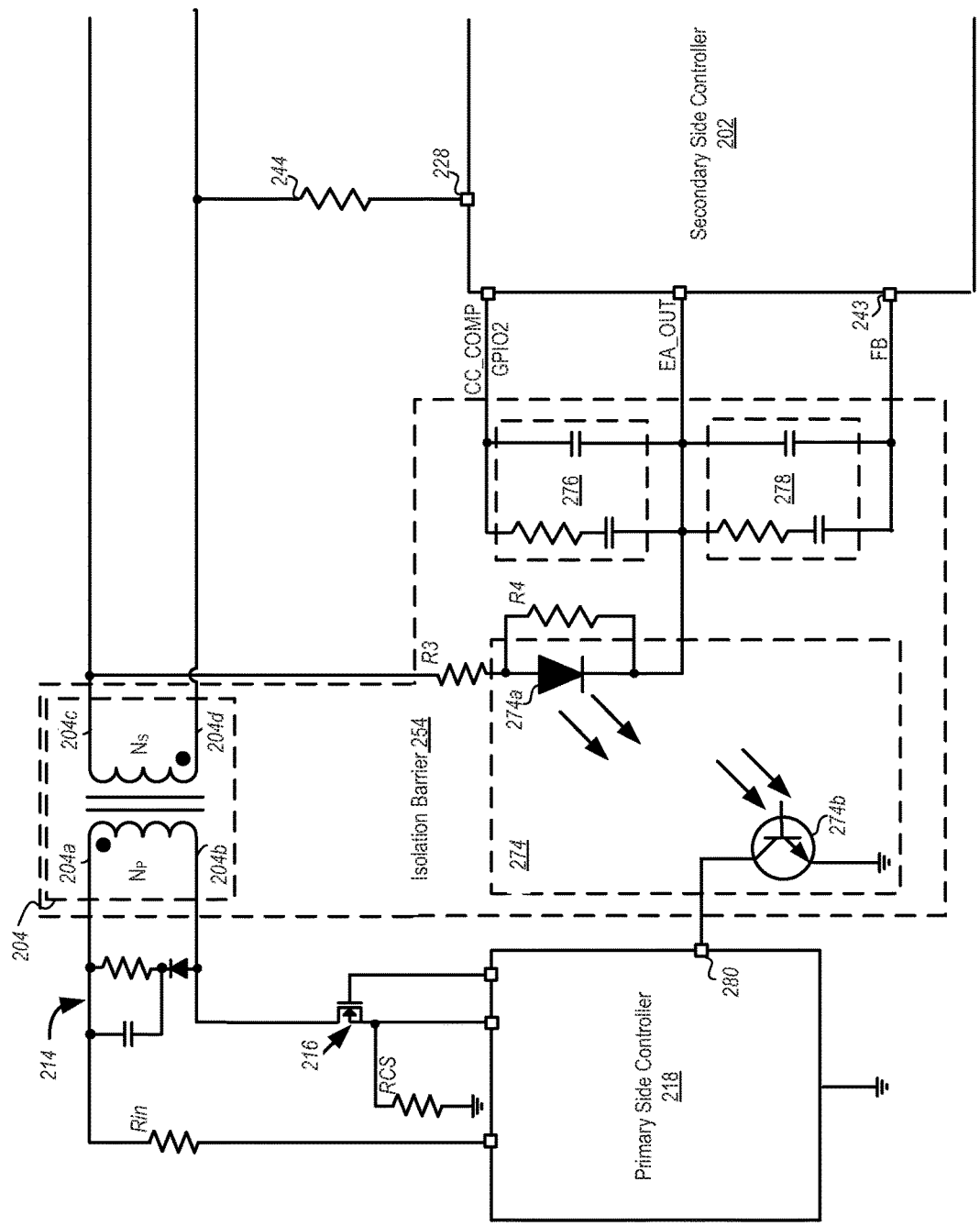
FIG. 2C is a schematic block diagram depicting an embodiment of the isolation barrier of FIG. 2A including an opto-isolator in accordance with the present disclosure.

Referring to FIG. 2C, in a first embodiment the isolation barrier 254 includes an opto-isolator 274 to provide electrical isolation between the feedback pin 243 of the secondary side controller 200 and the primary side controller 218. Generally, the opto-isolator includes a light emitting element, such as a light emitting diode (LED) 274a and a light sensitive element, such as a light sensitive or phototransistor 274b. The LED 274a has a cathode coupled directly to an error amplifier output pin (EA_OUT), and an anode coupled to the third terminal 204c of the transformer 204 through a voltage divider including a first resistive element (R3) and a second resistive element (R4). The cathode of the LED 274a is further coupled to the FB pin 243 and to a constant current compensation general purpose input/output (CC_COMP_G-PIO), through resistor-capacitor filters or networks 276 and 278. The phototransistor 274b can include a bipolar NPN transistor, and is coupled to the primary side controller 218 through an FB_input pin 280. In this embodiment, the secondary side controller 202 uses outputs from the error amplifier 272 to take the feedback from the secondary side and pass it on to the primary controller over the opto-isolator 274. This architecture provides three key features: secondary side sensing and regulation, synchronous rectification, and charging port controller.

Figure 2D:
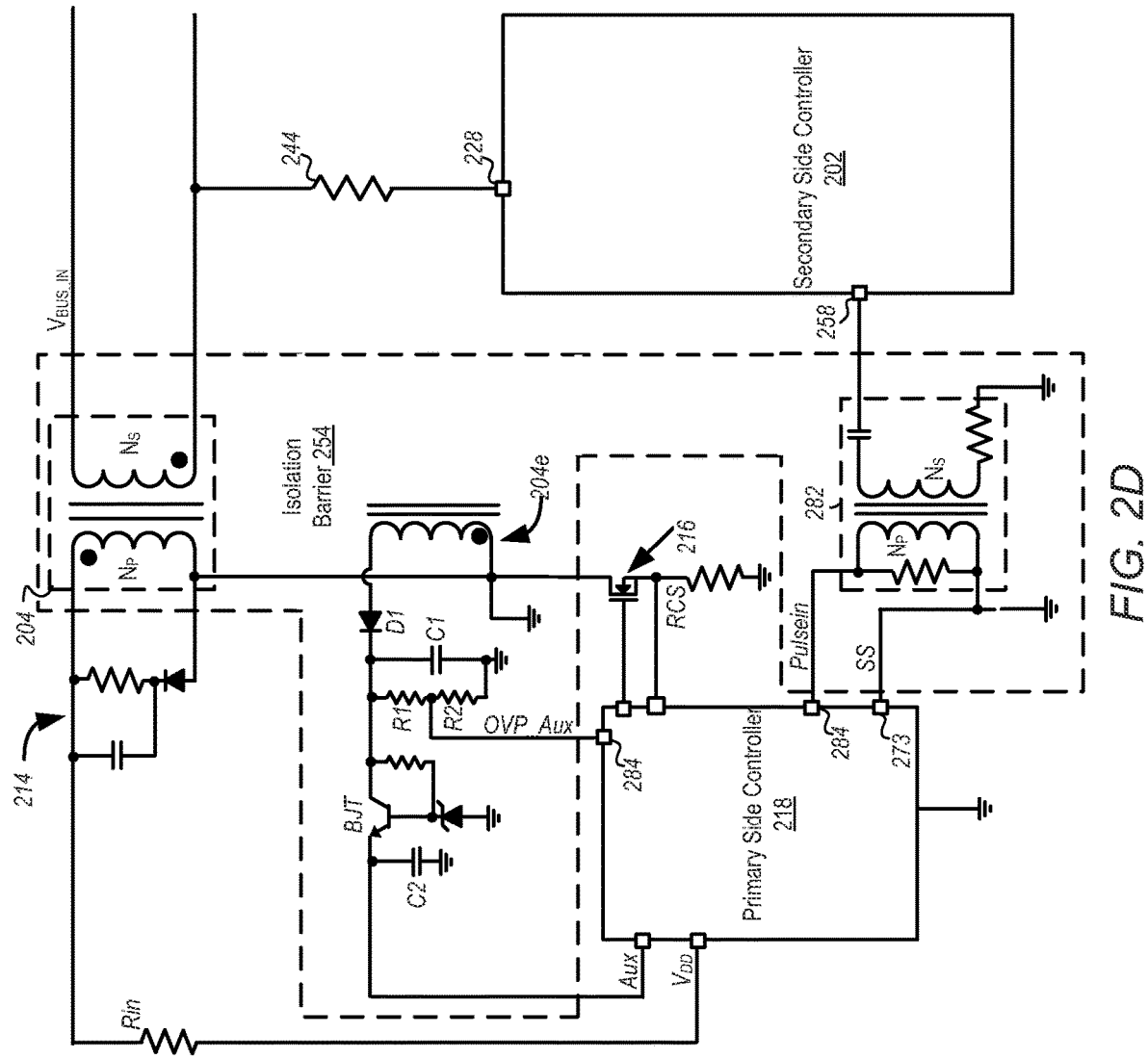
FIG. 2D is a schematic block diagram depicting another embodiment of the isolation barrier of FIG. 2A including a pulse transformer in accordance with the present disclosure.

FIG. 2D is a schematic block diagram depicting another embodiment of the isolation barrier of FIG. 2A including a pulse transformer 282 coupled between the PWM drive pin 258 of the secondary side controller 202 and a pulse_in pin 284 and a soft-start (SS) pin 273. The PWM drive pin 258 to the primary side controller 218 of the primary side controller 218 modulates the pulse width of the primary MOSFET in voltage mode control. In this architecture the primary side controller 218 engages the error amplifier 272 and the programmable ramp generator of the PWM circuit 264 to determine the pulse width of the PWM signal. This PWM signal is transferred from the secondary side controller 202 to the primary side controller 218 through the pulse transformer 282. This architecture, like that of FIG. 2C, also provides three key features: secondary side sensing and regulation, synchronous rectification, and charging port controller. The isolation barrier also includes an auxiliary coil of the transformer 204, which functions as a fly-back step-down transformer 204e to provide power to primary side controller 218 via an Aux pin. The step-down transformer 204e along with a diode D1 followed by capacitor C1 to ground stores the stepped-down-voltage which is then clipped by a bipolar junction transistor (BJT) structure and then coupled to the Aux pin. This additional circuit helps to reduce total power consumption of the AC-DC converter 200 as the primary side controller 218 is supplied through the Aux pin instead of by a separate power supply through another pin coupled to the first terminal 204a on the primary side 206 of the transformer 204 through Rin. A resistor divider R1, R2, connected to an over voltage protection (OVP)_AUX pin 284 of primary side controller 218 is used to sense a reflected voltage of VBUS_IN on the secondary side 208 via the step-down transformer 204e. With this VBUS_IN signal primary side controller 218 can disable PS 216, shown here as a PR_FET, using internal circuitry of the primary side controller.

Figure 2E:
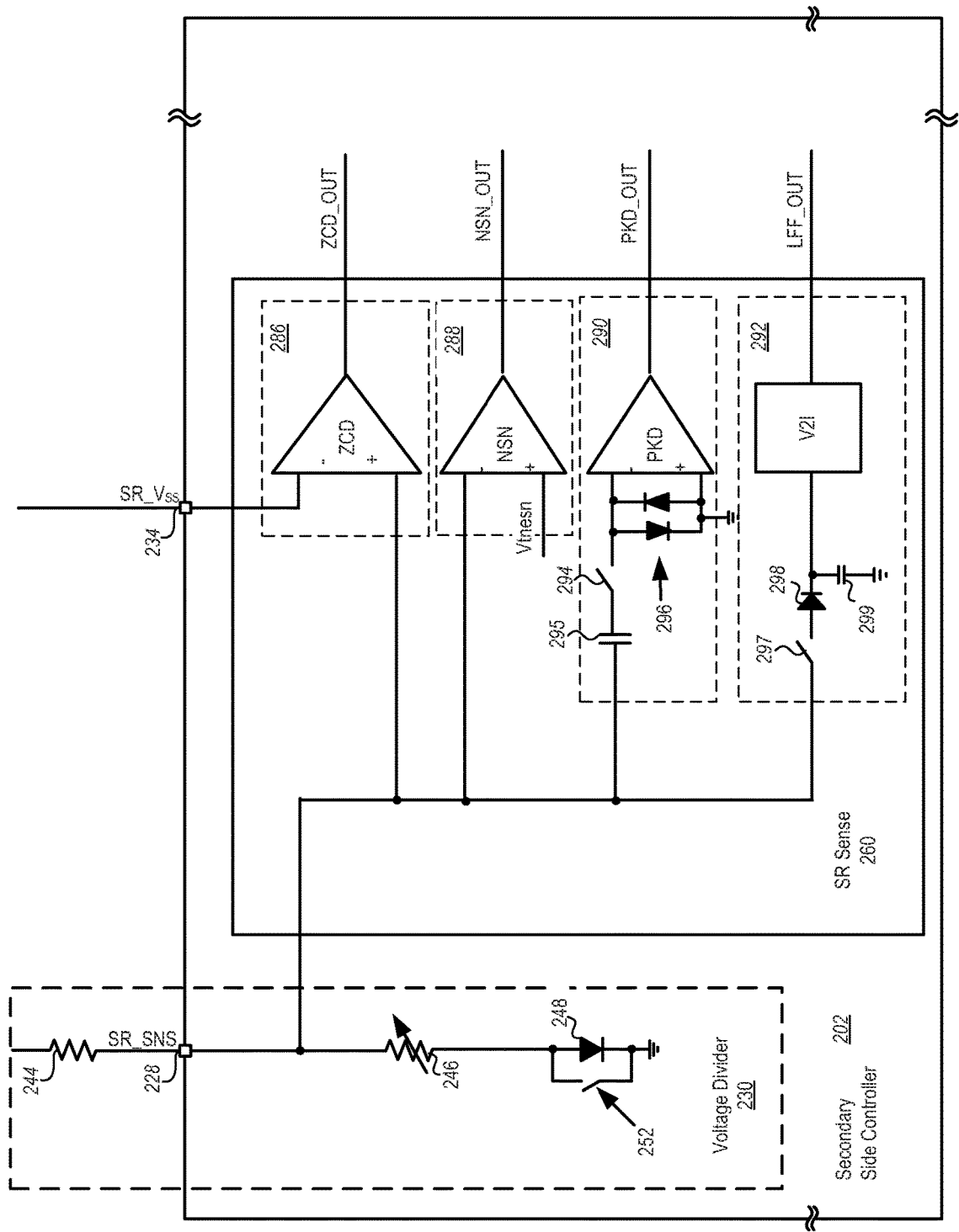
FIG. 2E is a schematic block diagram depicting of a portion of the secondary-side controller of FIG. 2B depicting an embodiment of the SR sense block in accordance with the present disclosure.

FIG. 2E is a schematic block diagram depicting of a portion of the secondary-side controller of FIG. 2B depicting an embodiment of the SR sense block 260 in accordance with the present disclosure. As shown in FIG. 2E, the SR sense block includes a zero-crossing detector (ZCD) block 286, a negative-sensing (NSN) block 288, a peak-detector (PKD) block 290, and Line-feed-forward (LFF) block 292, all integrally formed on a single IC with other components and elements of the secondary side controller 202.

The ZCD block 286 can include a comparator having a first, inverting input coupled through the SR-Vss pin 234 to the source node 226c of the SR 226, and a second, non-inverting input coupled to the SR-SNS pin 228 and through the voltage divider 230 to the drain node 226a of the SR. During the ZCD detection phase, where the SR_DRAIN 226a is at negative voltages and ramping towards 0V, the rectifier 248 is kept enabled without enabling switch 252 to allow no voltage division in voltage divider 230. This enables direct voltage of SR_DRAIN 226a at the non-inverting input 228 of the ZCD comparator 286. The comparator of the ZCD block 286 can be configured to generate a zero current signal (ZCD_OUT) to turn off the SR 226 when zero voltage is sensed on the SR-SNS pin 228 and SR_DRAIN pin 226a crossing without any voltage division. No voltage division enables precise detection of Zero-current (or voltage crossing of SR_DRAIN 226a which improves efficiency of the AC-DC converter 200.

The NSN block 288 can also include a comparator having a first, inverting input coupled to the SR-SNS pin 228 and through the voltage divider 230 to the drain node 226a of the SR 226, and a second, non-inverting input coupled to a negative reference voltage (Vtnesn) which can be anywhere from −700 mV to +200 mV. This reference voltage Vtnesn can be defined to desired negative voltage trip point at which the controller needs to turn-on the SR_GDRV 226b. An alternate method for negative reference voltage could be, for example, connecting non-inverting input coupled through the SR-Vss pin 234 to the source node 226c of the SR 226 and the comparator can have in-build offset to trip when SR-SNS pin 228 is at negative voltage. During the NSN detection phase, where the SR_DRAIN 226a is going from positive to negative voltages, the rectifier 248 is kept enabled without enabling switch 252 to allow no voltage division in voltage divider 230. This enables direct voltage of SR_DRAIN 226a at the inverting input 228 of the NSN comparator 288. The NSN comparator 288 generates a negative voltage signal (NSN_OUT) to turn-on the SR 226.

During power delivery on the secondary side, when the SR 226 turns-off, and as PS 216 has not yet turned-on, it results in LC sinusoidal oscillations on the SR_DRAIN 226a as well as inverted sinusoidal on the PR drain 204b terminal of the fly-back transformer 204. To improve AC-DC converter efficiency, primary switch 216 must be turned on when there is a Valley in these sinusoidal oscillations, which corresponds to Peak on the secondary SR_DRAIN 226a node. The PKD block 290 is the peak sensing block on the secondary side. The PKD block 290 can also include a comparator having a first, inverting input coupled to the SR-SNS pin 228 through a switch 294 and an internal capacitor 295, and from the SR-SNS pin to the drain node 226a of the SR 226 through the voltage divider 230, and a second, non-inverting input coupled to ground. Generally, as in the embodiment shown the PKD block 290 further includes a back to back connected diode circuit 296 across the first and second inputs to the comparator to detect the peak of the sinusoidal waveform seen on SR_SNS 228. The comparator is configured to generate a peak voltage detection signal (PKD_OUT), which can be coupled to the primary side controller 218 to turn on the PS 216 to enable a valley switching mode of operation. The switch 294 is kept off during NSN and ZCD detection phase to avoid capacitive load offered by PKD block, on SR_SNS 228 node, which reduces the delay in sensing NSN and ZCD and improves performance and efficiency of the AC-DC converter 200. The switch 294 is turned-on during Peak-detection function, by using a derived signal of ZCD_OUT as ZCD_OUT decides turning-off of SR FET 226, after which LC sinusoidal oscillation starts.

Finally, AC Line-Feed-forward (LFF) block 292 can include a voltage-to-current (V2I) block, which is coupled through a switch 297, a sample and hold arrangement using diode element 298 along with charge-storage element (capacitor 299) to the SR-SNS pin 228 and through the voltage divider 230 to the drain node 226a of the SR 226. During the phase when primary switch 216 is turned on, the difference between node 204d and 204c of fly-back transformer develops a proportional reflected voltage of line-in rectified voltage on node 204a of transformer 204, in accordance to turn-ratio (N) of fly-back transformer 204. As node 204d is also coupled to SR_DRAIN 226a which is used as a sensing node insider secondary-side-controller 202 after a resistor divider 230, the node SR_SNS 228 also carries the line-in voltage information which is derived using LFF block 292. The line-in information can be used by secondary-side-controller 202 to alter the valley switching or PWM pulse-width to optimize the efficiency of the AC-DC converter 200 across variable AC line-in. The phase where primary switch 216 is turned-on and SR_DRAIN 226a gets reflected proportional voltage, is defined as feed-forward sensing phase and during this phase, switch 297 is turned-on to start sensing line-In voltage via SR_SNS 228 pin. At the same time, switch 252 is also turned on to bypass rectifier element 248 to allow exact resistive divided version of SR_DRAIN 226a to reach at the input of LFF block 292. The switch 297 is kept off during NSN and ZCD detection phases to avoid capacitive load offered by LFF block on SR_SNS 228 node, which helps to reduce the delay in sensing NSN and ZCD and improves performance and efficiency of the AC-DC converter 200. LFF block 292 is configured to generate a current signal (IFF_OUT) when the AC-DC converter 200 is operating in a feed-forward sensing mode. This IFF_OUT current then can be used to modulate PWM pulse-width as per line AC voltage, which improves performance and efficiency of the AC-DC converter over wide-range of AC input voltage range. The IFF_OUT current can also be converted to voltage which would be proportional to line AC input voltage and can be used for any function required on the secondary side controller, like for altering Valley at which primary FET 216 to be turned-on based on line AC voltage for same output power requirement, to improve performance of the AC-DC converter 200.

Figure 4:
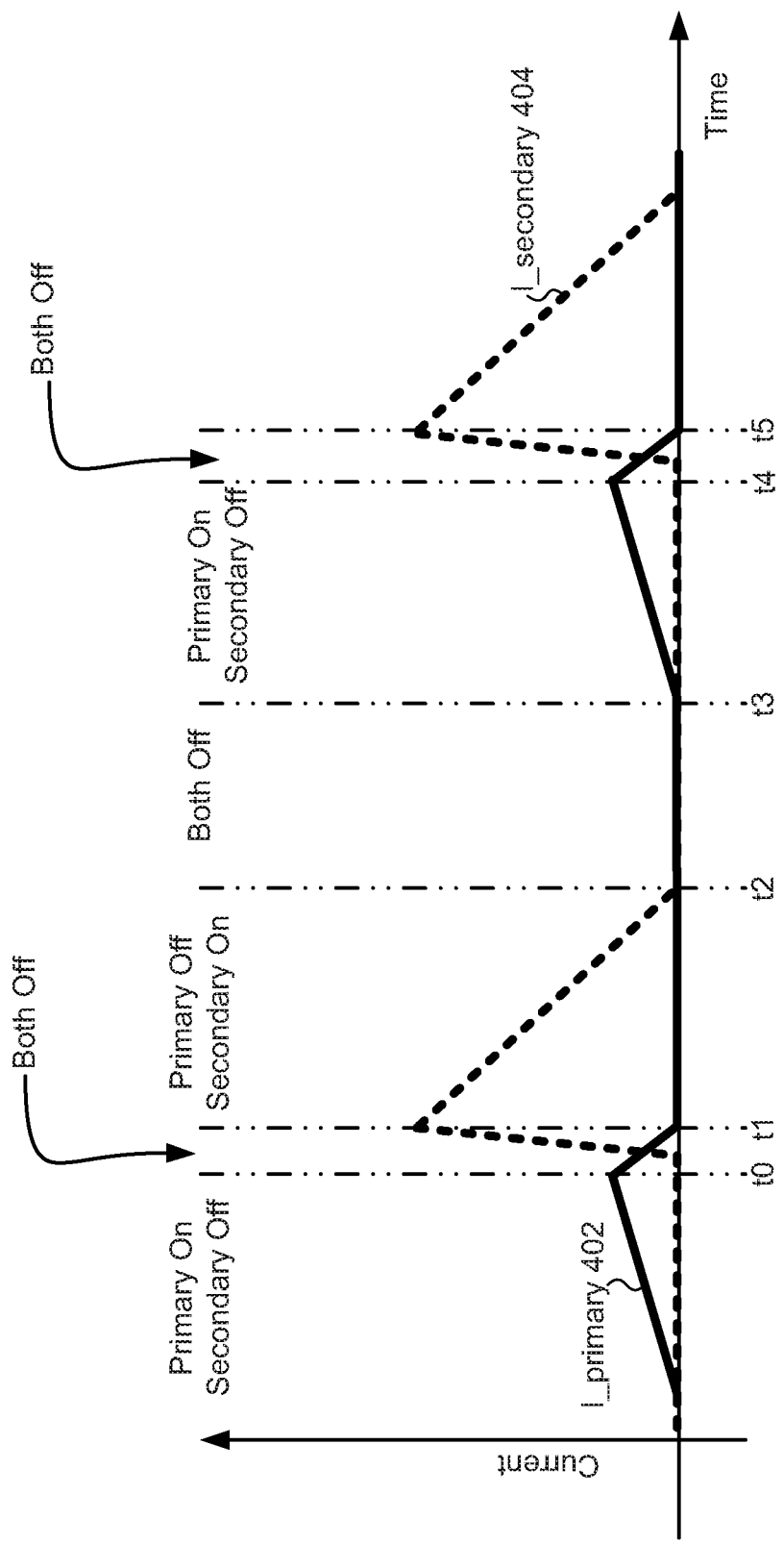
FIG. 4 is a graph showing primary current (I_primary) and secondary current (I_secondary) over time in the circuit of FIG. 2A as operated by the method of FIG. 3.
Figure 5:
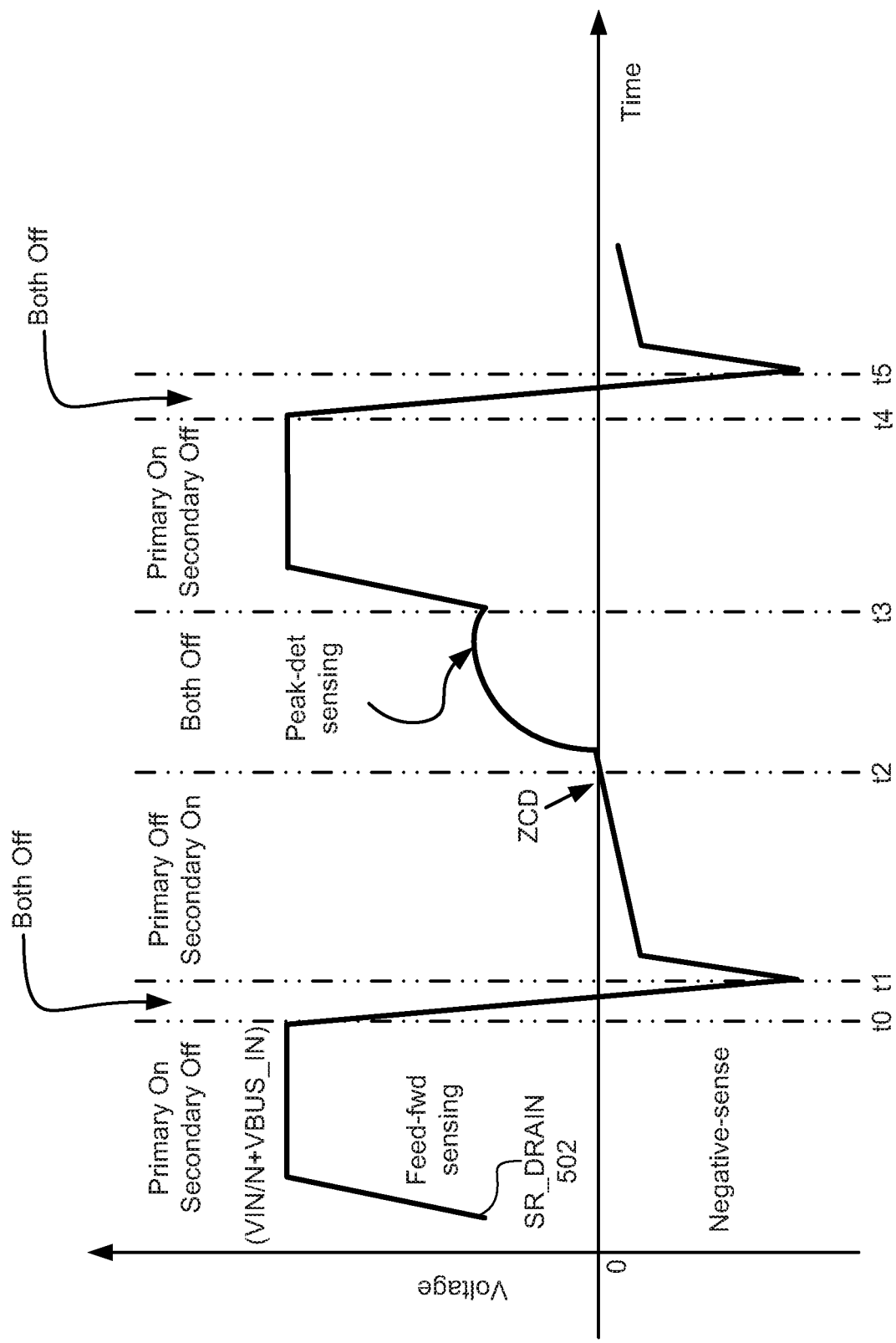
FIG. 5 is a graph showing voltage on a drain node of a SR over time in the in the circuit of FIG. 2A when operated by the method of FIG. 3.

A method of operating an AC-DC converter having a secondary side controller including an IC having a single SR-SNS pin through which the IC is coupled to the drain of a SR through a voltage divider will now be described with reference to the flowchart of FIG. 3, and the graphs of FIGS. 4 and 5. FIG. 4 is a graph showing primary current (I_primary 402) and secondary current (I_secondary 404) in the circuit of FIGS. 2A-E when operated by the method of FIG. 3. FIG. 5 is a graph showing the resulting voltage 502 on the drain node of the SR when operated by the method of FIG. 3.

Figure 3:
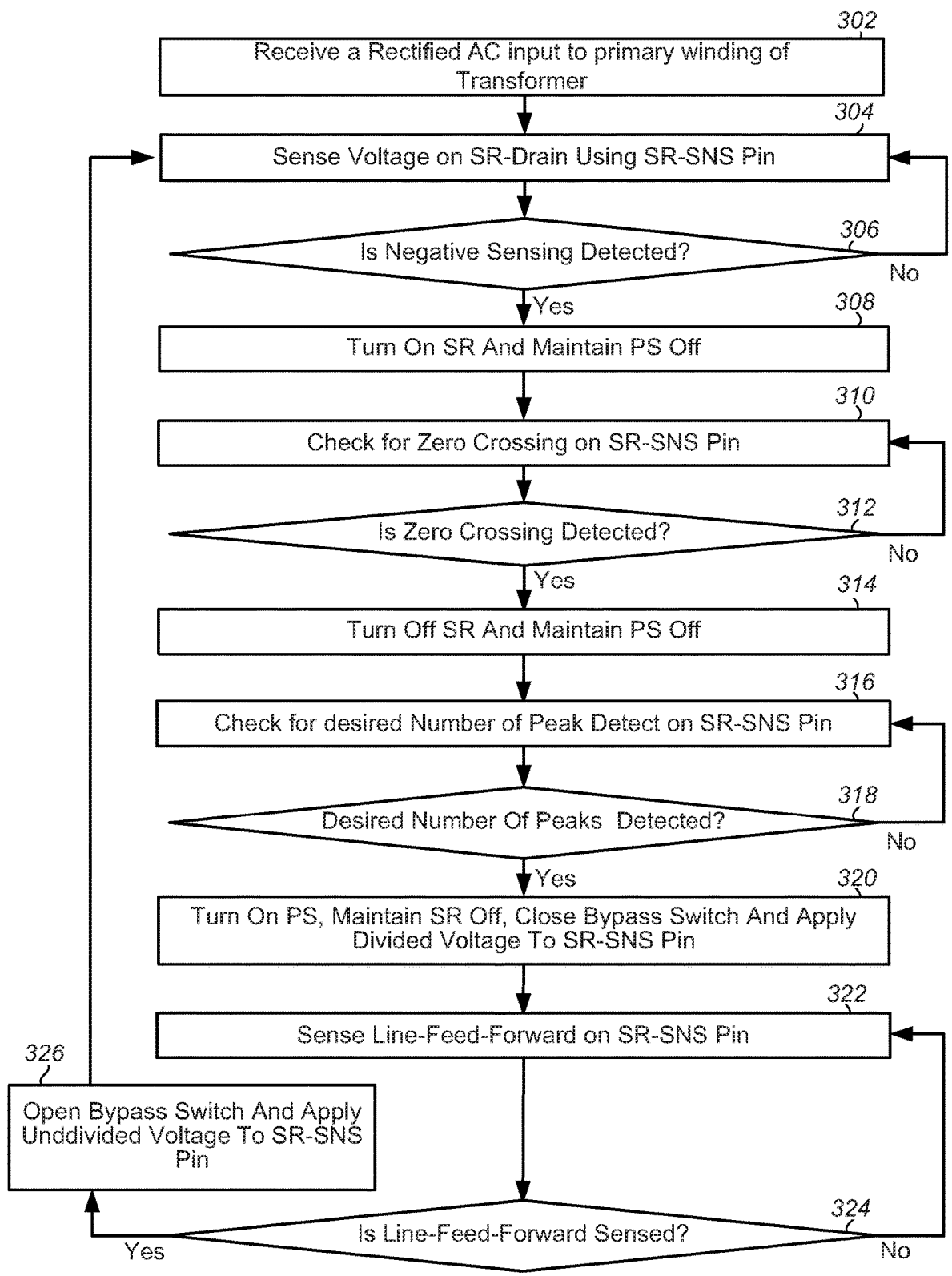
FIG. 3 is a flowchart illustrating an embodiment of a method for operating an AC-DC converter including a secondary-side controller and SR architecture in accordance with the present disclosure.

Referring to FIG. 3 and to FIGS. 2A and 2E the method begins with receiving a rectified AC input to the primary side 206 of the transformer 204 (302). A voltage on the drain 226a of the SR 226 is sensed through the single SR-SNS pin 228 (304). Next, it is determined if negative sensing is detected (306). Generally, determining if the AC-DC converter is operating in a negative sensing mode is accomplished by sensing an increasing negative voltage on the SR-SNS pin 228. If negative sensing is not detected step or block 304 is repeated and the voltage on the drain 226a of the SR 226 continues to be sensed through the single SR-SNS pin 228. If negative sensing is detected, the SR 226 is turned on while the power switch or PS 216 on the primary side is 206 of the transformer 204 is maintained off (308).

Next, a check is performed for a zero crossing on SR-SNS pin 228 using the ZCD block 286 in the secondary side controller 202 (310), and it is determined if a zero-crossing is detected (312). If a zero crossing is not detected step or block 310 is repeated to continue to check for a zero crossing on the SR-SNS pin 228. If a zero crossing is detected, the SR 226 is turned off and the PS 216 is maintained off (314).

A check is then performed for a predetermined or desired number of peaks of a predetermined or desired peak voltage detected on SR-SNS pin 228 using the PKD block 290 in the secondary side controller 202 (316), and it is determined if the desired number of peaks is detected (318). If the desired number of peaks is not detected step or block 316 is repeated to continue to check for the desired number of peaks. If the desired number of peaks is detected, the SR 226 is maintained off, the PS 216 is turned on (320), and the bypass switch 252 closed to apply a divided voltage to the SR-SNS pin 228.

Next, a check is performed to sense if the AC-DC converter 200 is operating in a Line-Feed-forward (LFF) sensing mode (322), and a determination made whether or not LFF is sensed (324). Generally, determining if the AC-DC converter 200 is operating in a LFF sensing mode is accomplished by sensing a rising or steady positive voltage on drain 226a of the SR 226 applied through the single SR-SNS pin 228 using the LFF block 292. If the AC-DC converter 200 is not operating in a LFF sensing mode, step or block 322 is repeated to continue to check for LFF sensing. If it is determined the AD-DC converter is operating in a LFF sensing mode, bypass switch 252 is opened so that the voltage applied to the secondary side controller 202 through the single SR-SNS pin 228 is undivided by the voltage divider 230 (326), and step or block 304 is repeated to sense voltage on the drain 226a of the SR 226 through the single SR-SNS pin 228.

Figure 6A:
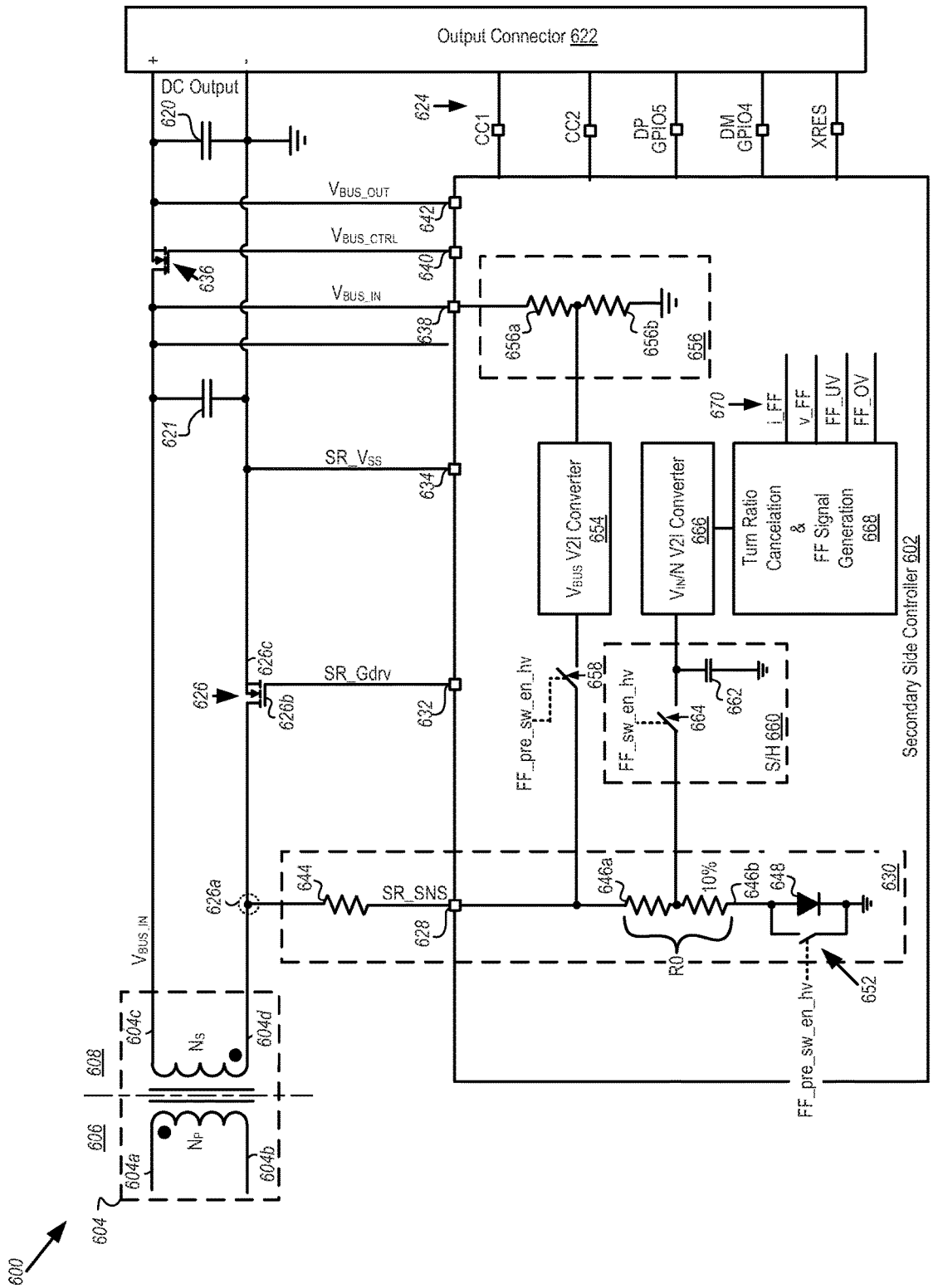
FIG. 6A is a schematic block diagram depicting a portion of an AC-DC converter including a secondary-side controller adapted to extract primary side voltage ($V_{IN}$) from voltage on a drain node of a secondary side SR to improve efficiency in accordance with the present disclosure.

In another aspect the present disclosure is directed to an AC-DC converter including a secondary-side controller configured to provide line or input voltage ($V_{IN}$) detection from the secondary side, which is then used to optimize performance or efficiency of the AC-DC converter. Embodiments of such an AC-DC converter will now be described with reference to FIGS. 6A through 6D. FIG. 6A is a schematic block diagram of a portion of an AC-DC converter 600 including a secondary-side controller 602 with such a configuration in accordance with the present disclosure and having a SR architecture.

Referring to FIG. 6A, the AC-DC converter 600 includes a transformer 604 having a primary winding (NP) on a primary side 606 electrically connected or coupled to an AC input, and a secondary winding (NS) on a secondary side 608 coupled to a DC output. Although not shown in these figures, it will be understood that the primary side 606 of the AC-DC converter 600 generally further includes rectifying circuit, such as a bridge rectifier, one or more input filters coupled between a first and terminal 604a and a second terminal 604b of the transformer 604, and a power switch (PS), such as a primary field effect transistor (PR_FET), coupled to a primary side controller, as shown and described above with respect to FIG. 2A. Optionally, the AC-DC converter 600 may further include an isolation buffer, as shown and described above with respect to FIGS. 2C and 2D.

On the secondary side 608 the AC-DC converter 600 includes a filter capacitor 621 coupled between a third terminal 604c of the transformer 604 and an electrical ground or ground terminal, and an output capacitor 620 coupled between a third terminal 604c of the transformer 604 and an electrical ground provide a DC output voltage ($V_{BUS\_OUT}$) to an output interface or connector 622. Generally, as in the embodiment shown the output connector 622 is further coupled to the secondary side controller 602 through a number of communication channels 624 to support various charging protocols. Suitable output connectors 622 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector can include a Universal Serial Bus type C (USB-C) compatible connector where the AC-DC converter 600 is compliant with the USB protocol to provide a DC output voltage of about 3.3 VDC to about 21.5 VDC at a current of from about 0 to about 3000 milliamps (mA).

In accordance with the present disclosure, the AC-DC converter 600 further includes on the secondary side 608 a synchronous rectifier (SR 626), such as a synchronous rectifier field effect transistor (SR_FET), coupled between a fourth terminal 604d of the transformer 604 and the ground terminal of the DC output. The SR 626 includes a first or drain node 626a coupled to the fourth terminal 604d of the transformer 604 and the secondary side controller 602 to sense a voltage on the drain of the SR; a second or gate node 626b coupled to the secondary side controller to drive or control the SR; and a third or source node 626c coupled to the secondary side controller and the ground terminal of the DC output.

In certain embodiments, such as that shown, the secondary side controller 602 is realized or implemented as single integrated circuit (IC), or as a number of ICs packaged in a single IC package, and the drain node 626a is coupled to a single SR-SNS pin 628 of the IC through a voltage divider 630 including circuit elements both internal and external to the IC of the secondary side controller. The gate node 626b of the SR 626 is coupled to the secondary side controller 602 through a SR-drive pin 632, and the source node 626c of the SR is coupled to the secondary side controller through a SR-Vss (ground voltage level) pin 634.

Optionally, as in the embodiment shown, the secondary side further includes an additional or secondary switch (SS) 636, such as a NFET, coupled between the third terminal 604c of the transformer 604 and a positive DC output to enable to the secondary side controller 602 to turn off the DC output to protect against over voltage and/or under voltage conditions. The SS 636 includes a drain node coupled to a voltage bus in pin ($V_{BUS\_IN}$) 638 of the secondary side controller 602; a gate node coupled to a voltage bus control pin ($V_{BUS\_CTRL}$) 640 to drive or control the SS; and a source node coupled to a voltage bus out pin ($V_{BUS\_OUT}$) 642 and to the positive terminal of the DC output.

The voltage divider 630 includes an external resistive element (Rext 644), an internal resistive element (R0) made up of a series connected first internal resistive 646a and second internal resistive 646b, and an internal rectifier 648. Although shown schematically as a diode, it will be understood that this need not be case in every embodiment, and that internal rectifier 648 may be a PN diode (as shown), or alternatively, a synchronous diode or a FET configured or connected to function as a diode. The configuration or placement of the internal rectifier 648, i.e., connected with a cathode to ground, ensures that during negative sensing or zero-crossing operations there is substantially no current flow through the voltage divider 630, thereby allowing the full, undivided negative voltage on the drain node 626a to be coupled to the SR-SNS pin 628. A resistance value of external resistive element 644 is generally fixed by the manufacturer of the AC-DC converter 600 and is selected based on an expected maximum voltage on the drain node 626a based on the maximum AC voltage input, and turn-ratio of the transformer 604 to limit a maximum voltage on the SR_SNS node 628 to enable the secondary side controller 602 to be a made with non-high voltage devices, made using standard, low voltage technologies. Suitable values for the resistance of the resistive element 644 are from about 4KΩ to about 10KΩ. For example in one embodiment in which the maximum input voltage after a bridge rectifier is 380V and the transformer 604 has a 4:1 turn ratio, and the voltage of 21.5V DC on VBUS_IN, the SR_DRAIN 626a voltage can be 116.5V. Secondary side controller 602 is fabricated using a 20V tolerant technology, so the external resistive element 644 is selected to have a resistance of about 10KΩ and internal resistance of about 2KΩ to limit the maximum voltage on the drain node 626a to no more than about 21.5V.

The first and second internal resistive elements 646a and 646b can have a resistance value set by the manufacturer at the time the AC-DC converter 600 is manufactured based on either desired input or output voltages, or to compensate for variations in parameters of the IC or other components in the AC-DC converter. Furthermore, the resistance values of the first and second internal resistive elements 646a and 646b, can be chosen relative to one another to limit the voltage sampled by a sample and hold (S/H) circuit or module in the secondary side controller 602. For example, in one embodiment the lower internal resistance element 646b has a resistance about 10% that of internal resistance element 646a to enable use of low voltage, 3 to 5 volt components in the S/H module.

Optionally, as in the embodiment shown, the voltage divider 630 further includes a bypass switching element or switch 652 in parallel the internal rectifier 648. The switch 652 is closed during feed-forward (ff) sensing in response to a feed forward pre-switch enable signal (FF_pre_sw_en) generated in the secondary side controller 602 upon detection of an increasing or non-zero positive voltage on the drain node 626a, which indicates a feed-forward mode or operation. As in the embodiment shown in FIG. 6A the internal rectifier 648 and the switch 652 while shown schematically as two separate and distinct elements may alternatively include a single device, such as a FET.

As shown in FIG. 6A, the AC-DC converter 600 further includes $V_{BUS}$ voltage-to-current (V2I) converter 654 coupled to the $V_{BUS\_IN}$ pin 638 through a second voltage divider 656 including the first and second internal resistive elements 656a and 656b and, when the AC-DC converter 600 is operating a feed-forward (FF) mode, to the SR-SNS pin 628 through a switch 658. In feed forward mode, a feed forward pre-switch enable signal (FF_pre_sw_en) to close switch 652 and switch 658. As explained above closing bypass switch 652 when the converter is operating in the feedforward mode causes the voltage applied to the SR-SNS pin 628 to be divided, enabling the secondary-side controller 602 to be a made with non-high voltage devices, made using standard, low voltage technologies. Closing switch 658 couples the $V_{BUS}$ V2I converter 654 to the SR-SNS pin 628 to draw or sink a current ($I_{VBUS\_SINK}$) through Rext 644 to remove from $V_{SR-SNS}$ the component of $V_{SRD}$ arising from $V_{BUS}$, resulting in a voltage on the SR-SNS pin 628 of:

$$VSR-SNS = \frac{VIN}{N} * \frac{R0}{(Rext+R0)}$$

where VIN is the input voltage to the primary side of the transformer; N is the turn ratio of the transformer; R0 is a sum of the internal resistance elements 646a and 646b of the voltage divider 630; and Rext is the resistance of the external resistance element 644 of the voltage divider.

The AC-DC converter 600 further includes a sample and hold (S/H) circuit or module 660 coupled to the SR-SNS pin 628 when the AC-DC converter 600 is operating in the FF mode to sample and hold a voltage ($V_{SAMP}$) including information on $V_{IN}/N$. In the embodiment shown the S/H module 660 includes a charge storage element, such as a capacitor 662, an S/H switch 664 through which the capacitor is coupled to the SR-SNS pin 628. It is noted that because $V_{SAMP}$ is taken from between internal resistance elements 646a and 646b $V_{SAMP}$ is less than $V_{SR-SNS}$ on the pad of the SR-SNS pin 628, however it will be understood $V_{SAMP}$ is proportional to and varies with $V_{SR-SNS}$, and includes more accurate information on $V_{IN}/N$ than it was possible to detect using a conventional secondary-side controller. A feed forward switch enable signal (FF_sw_en) generated in the secondary controller closes S/H switch 664 briefly during feed forward operation while switch 652 is also closed to that $V_{SAMP}$ substantially does not include the component of $V_{SRD}$ arising from $V_{BUS}$.

The AC-DC converter 600 further includes a $V_{IN}/N$ V2I converter 666 coupled to the S/H module 660 and to a turn ratio cancellation and FF signal generation circuit 668 to convert $V_{SAMP}$ to a feed-forward current (In) comprising information on $V_{IN}/N$. For example, in one embodiment where the lowest internal resistance element 646b in the voltage divider has a resistance about 10% that of internal resistance element 646a, the conversion of $V_{SAMP}$ results in a feed-forward current ($i_{FF}$) of:

$$i\_feedfwd = \left(\frac{VIN}{N} * \frac{R0}{10*(Rext+R0)} * \frac{1}{R1}\right)*M$$

where VIN is the input voltage; N is the turn ratio; R0 is a sum of the internal resistance elements 646a and 646b; Rext is the resistance of the external resistance element 644; R1 is an internal resistance of the VIN/N V2I converter 666; and M is the current multiplier of the turn-ratio cancellation and FF signal generation circuit 668.

Finally, information on $V_{IN}$ is extracted from the $i_{FF}$ using the turn-ratio cancellation and FF signal generation circuit 668, and FF signals 670 generated for use by the secondary side controller 602 to control the AC-DC converter 600 in FF mode. Signals generated can include a feed forward current signal (I_FF), a feed forward voltage signal (V_FF), a feed forward under voltage signal (FF_UV), and a feed forward over voltage signal (FF_OV).

Figure 6B:
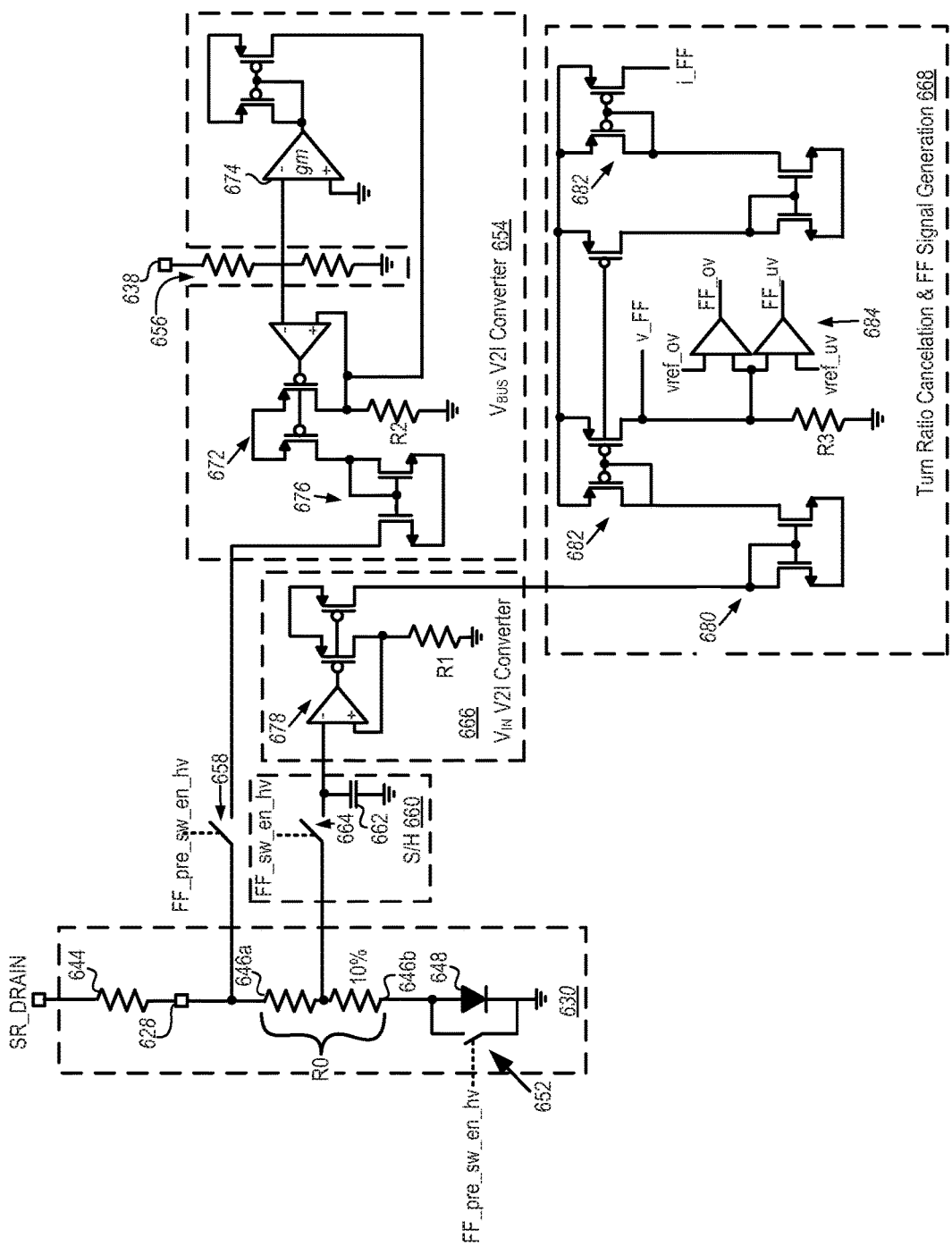
FIG. 6B is a schematic block diagram depicting of a portion of the secondary-side controller of FIG. 6A in accordance with an embodiment of the present disclosure.
Figure 6C:
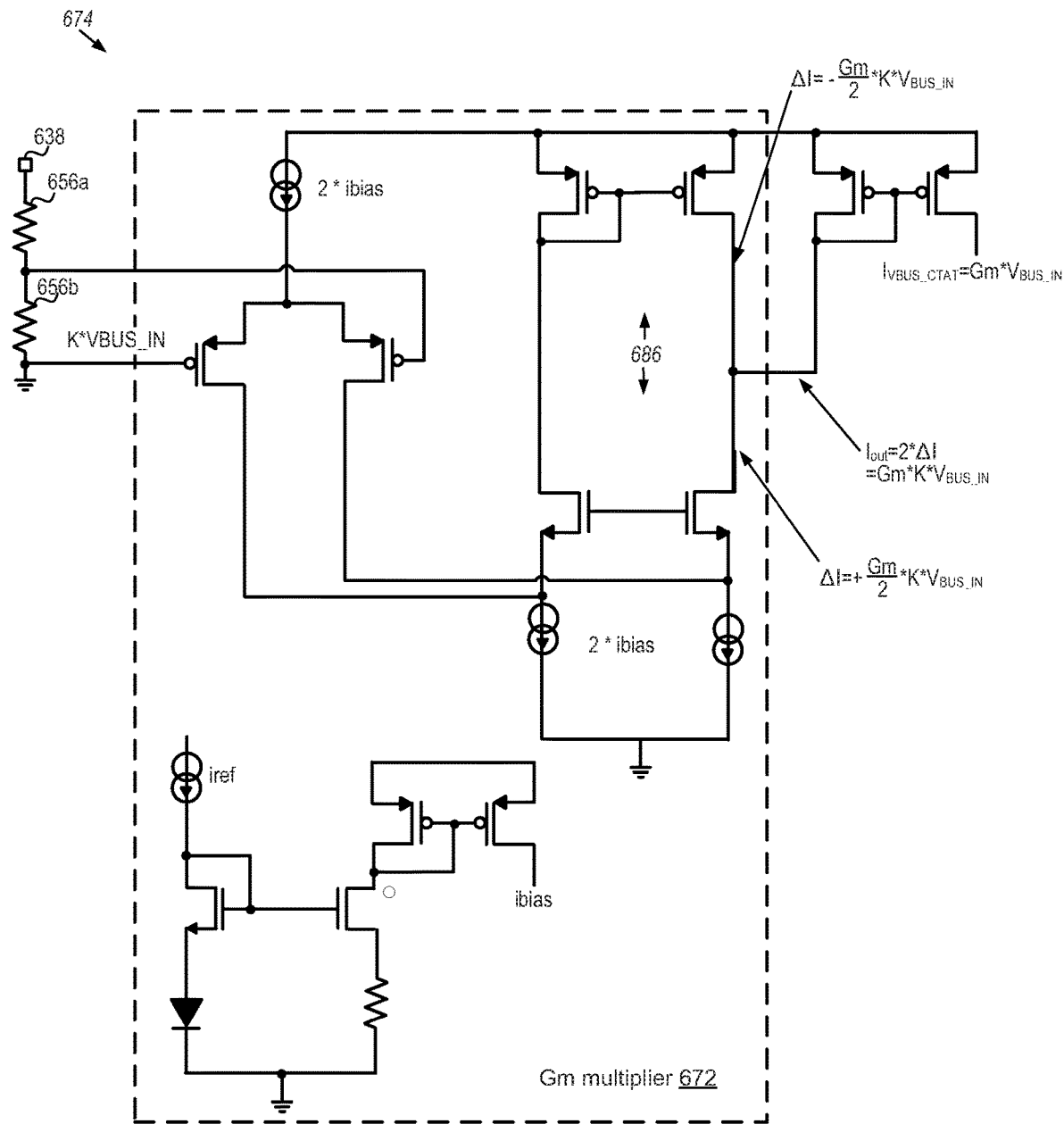
FIG. 6C is a schematic block diagram of a portion of the VBUS voltage-to-current (V2I) converter of FIG. 6B depicting an embodiment of a Gm multiplier in accordance with an embodiment of the present disclosure.

FIG. 6B is a schematic block diagram depicting of a portion of the secondary-side controller of FIG. 6A in accordance with an embodiment of the present disclosure. Referring to FIG. 6B, the $V_{BUS}$ V2I converter 654 is configured to generate a current $I_{VBUS\_SINK}=V_{BUS\_IN}/Rext$ to cancel $V_{BUS\_IN}$ component across external off-chip resistor (Rext) 644. The $V_{BUS}$ V2I converter 654 includes an operational amplifier (OpAmp) based voltage-to-current converter 672 for generation of $I_{VBUS\_SINK}$, and a temperature compensated on-chip constant resistor (R2) created using an open-loop trans-conductance amplifier (gm 674), which is biased with a complimentary to absolute temperature (CTAT) current as shown in FIG. 6C to cancel VBUS component accurately across temperature variation. The output of the $V_{BUS}$ V2I converter 654 is given by:

$$I_{VBUS} = VBUS\_IN * \left(\frac{1}{R2} - Gm\right)$$

where "$V_{BUS\_IN}/R2$" is the output of the OpAmp based voltage-to-current converter 672; and a temperature compensated current ($I_{VBUS\_CTAT}$) is equal to $V_{BUS\_IN\,multiplied}$ by a gain (Gm) of the open-loop trans-conductance amplifier 674 (gm*$V_{BUS\_IN}$), and is proportional to VBUS_IN, where Gm has CTAT nature. Since R2 has a proportional to absolute temperature (PTAT) nature, $V_{BUS\_IN}/R2$ would be CTAT nature, and current ($I_{VBUS}$) subtracted or sunk through Rext 644 to cancel the $V_{BUS\_IN}$ component of $V_{SR-SNS}$ is constant across temperature. Temperature compensated $I_{VBUS}$ is mirrored and multiplied by a current mirror 676 to generate of $I_{VBUS\_SINK}$ on the output of the $V_{BUS}$ V2I converter 654, and sunk through Rext 644 to remove from $V_{SR-SNS}$ the component of $V_{SRD}$ arising from $V_{BUS}$.

Referring to FIG. 6B, the $V_{IN/N}$ V2I converter 666 also includes an operational amplifier (OpAmp) based voltage-to-current converter 678 configured to convert the voltage ($V_{SAMP}$) held on the capacitor 662 of the S/H module 660 to feed-forward current ($i_{FF}$).

The turn-ratio cancellation and FF signal generation circuit 668 includes a multiplier circuit 680 for turn-ratio cancellation. The feed-forward current ($i_{FF}$) is used to generate a feed-forward voltage ($V_{FF}$) across resistor R3. Optionally, the elements of the multiplier circuit 680 are further selected to center the resultant multiplied feed-forward current ($i_{FF}$) independent of $V_{FF}$. Generally, as in the embodiment shown, the turn-ratio cancellation and FF signal generation circuit 668 further includes two more current mirrors 682 and comparators 684 to compare $V_{FF}$ against two predefined references to detect an over-voltage (FF_OV) and an under-voltage (FF_UV) condition of $V_{IN}$.

An embodiment of the open-loop trans-conductance amplifier (Gm 674) of the $V_{BUS}$ V2I converter 654 will now be described with reference to FIG. 6C. Referring to FIG. 6C, since $V_{BUS\_IN}$ can be as high as 20V, voltage divider 656 divides $V_{BUS\_IN}$ to make circuit high-voltage tolarent. The open-loop trans-conductance amplifier 674 is biased with a CTAT current (ibias) generated by the circuit in the lower left of FIG. 6C, shown. Since the open-loop trans-conductance amplifier 674 is biased with current having CTAT nature, the the open-loop trans-conductance amplifier is also CTAT in nature A differential output current proportional to $V_{BUS\_IN}$ is collected using output current mirror 686 and the multiplied to get required $I_{VBUS\_CTAT}$ The output of the trans-conductance amplifier (Gm 674) is given by:

$$I_{VBUS\_CTAT} = Gm * V_{BUS\_IN}$$

where Gm is the gain of the the open-loop trans-conductance amplifier 674.

Figure 6D:
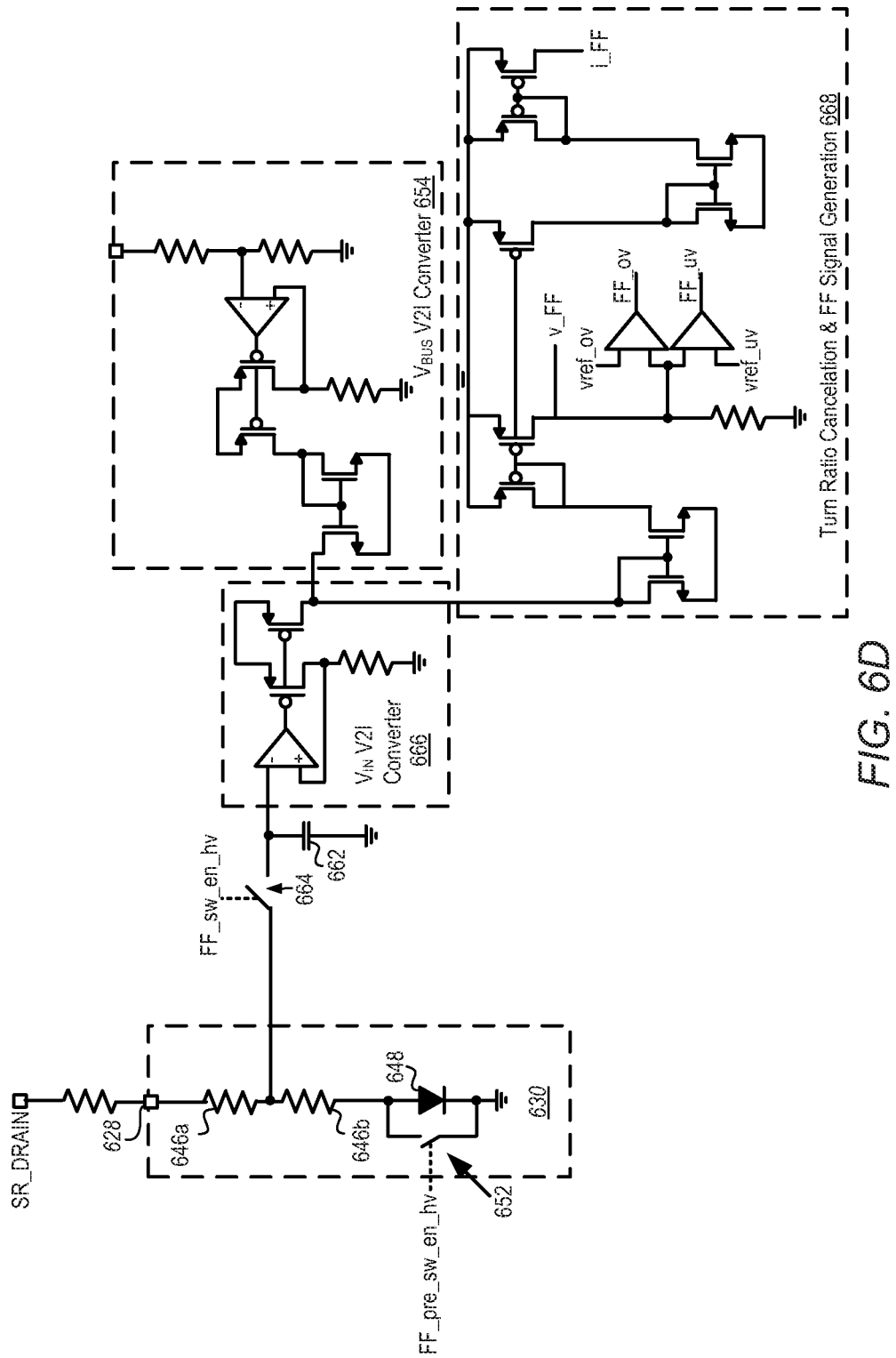
FIG. 6D is a schematic block diagram depicting of a portion of the secondary-side controller of FIG. 6A in accordance with another embodiment of the present disclosure.

FIG. 6D is a schematic block diagram depicting of a portion of the secondary-side controller of FIG. 6A in accordance with another embodiment of the present disclosure. Referring to FIG. 6D the $V_{BUS}$ V2I converter 654 is coupled to the SR-SNS pin 628 through the $V_{IN}$/N V2I converter 666, and the $V_{BUS}$ V2I converter is configured to subtract from $i_{FF}$ in the VIN/N V2I converter a current substantially equivalent to a current capable of generating $V_{BUS}$ across a resistance equal to Rext 644. For example, in one embodiment where the lowest internal resistance element 646b in the voltage divider has a resistance about 10% that of internal resistance element 646a, the conversion of VSAMP results in a feed-forward current ($i_{FF}$) of:

$$i\_feedfwd = \left(\frac{VIN}{N} * \frac{R0}{10*(Rext+R0)} * \frac{1}{R1}\right)*M +$$
$$\left(VBUS\_IN * \frac{R0}{10*(Rext+R0)} * \frac{1}{R1} - K * \frac{VBUS\_IN}{R2}\right)$$

where VIN is the input voltage; N is the turn ratio; R0 is a sum of the internal resistance elements 646a and 646b; Rext is the resistance of the external resistance element 644; R1 is an internal resistance of the VIN/N V2I converter 666; M is the current multiplier of the turn-ratio cancellation and FF signal generation circuit 668; and K is a current multiplier of the $V_{BUS}$ V2I converter 654 selected to remove VBUS Alternatively, in an embodiment not shown, the VBUS V2I converter, the VIN/N V2I converter and the N cancellation and signal module can be replaced by a microprocessor configured to remove VBUS from the voltage (VSRD) on the SR-SNS pin, convert the resultant voltage to a feed-forward current (IFF), and to extract from the IFF information on VIN and generate FF signals used by the secondary side controller to control the converter.

A method of operating a AC-DC converter having SR architecture and a secondary side controller including an IC and configured to extract information on an input voltage ($V_{IN}$) as shown in FIG. 6A will now be described with reference to the flowchart of FIG. 7, and the graphs of FIG. 8.

Figure 7:
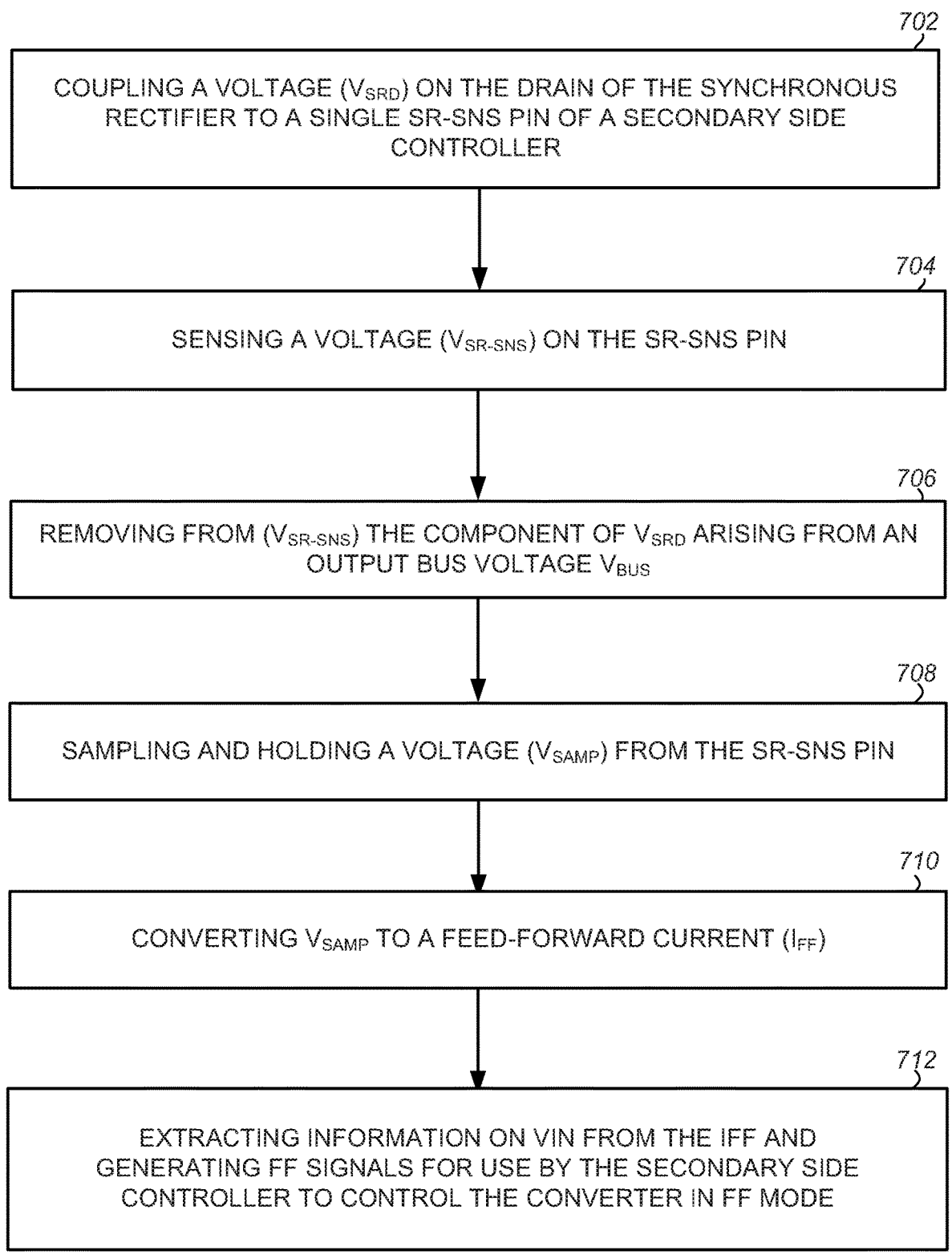
FIG. 7 is a flowchart illustrating a method for operating the AC-DC converter of FIG. 6A in accordance with an embodiment of the present disclosure.
Figure 8:
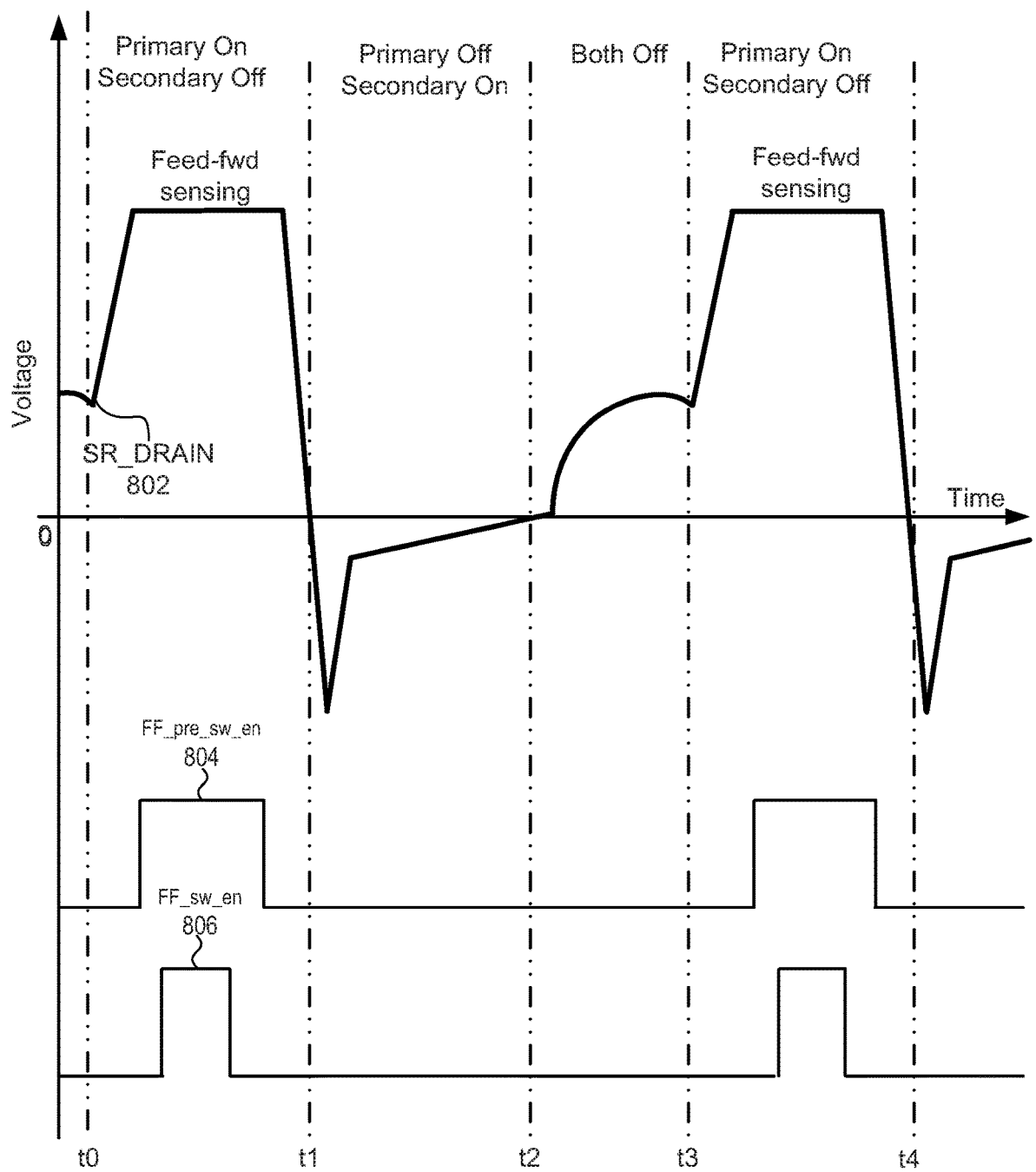
FIG. 8 includes a graph showing voltage on a drain node of the SR of the secondary-side controller of FIG. 6A over time and enable signals to controlling switches coupling voltage-to-current (V2I) converters in the secondary-side controller as operated by method of FIG. 7.

Referring to FIGS. 7 and 8 the method begins with coupling a voltage ($V_{SRD}$) on the drain of the synchronous rectifier to a single SR-SNS pin of a secondary side controller (702), and sensing the resulting voltage ($V_{SR-SNS}$) on the SR-SNS pin (704). The top graph of FIG. 8 shows a voltage 802 on a drain node of an SR in the AC-DC converter of FIG. 6A when operated by the method of FIG. 7. Next, a portion or component of $V_{SRD}$ that is caused by or arises from an output bus voltage ($V_{BUS}$) is removed or canceled from $V_{SR-SNS}$ (706). Referring to FIGS. 6A and 8 this removal can be accomplished while the converter is operating in the feedforward mode between t0 and t1 by coupling a feed forward pre-switch enable signal (FF_pre_sw_en 804) to close switches 652 and 658. As explained above closing bypass switch 652 when the converter is operating in the feedforward mode causes the voltage applied to the SR-SNS pin 628 to be divided, enabling the secondary-side controller 602 to be a made with non-high voltage devices, made using standard, low voltage technologies. Closing switch 658 couples the $V_{BUS}$ V2I converter 654 to the SR-SNS pin 628 to draw or sink a current ($I_{VBUS}$) through Rext 644 to remove from $V_{SR-SNS}$ the component of $V_{SRD}$ arising from VBUS. As noted above because of the constant resistance of the VBUS V2I converter 654 created using current complimentary to absolute temperature (CTAT) the secondary side controller and method of the present disclosure is able to cancel the $V_{BUS}$ component accurately across temperature variations.

Next, a voltage ($V_{SAMP}$) coupled from the SR-SNS pin 628 through the voltage divider 630 is sampled and held the S/H capacitor 662 (708). Referring to FIGS. 6A and 8 this is accomplished between t0 and t1 while FF_pre_sw_en 804 is asserted by coupling a feed forward switch enable signal (FF_sw_en 806) to close switch 664. It is noted that because $V_{SAMP}$ is taken from between internal resistance elements 646a and 646b $V_{SAMP}$ is less than $V_{SR-SNS}$ on the pad of the SR-SNS pin 628, however it will be understood $V_{SAMP}$ is proportional to and varies with $V_{SR-SNS}$, and includes more accurate information on $V_{IN}$/N than it was possible to detect using a secondary-side controller.

The sampled voltage ($V_{SAMP}$) held on the S/H capacitor 662 is then converted to a feed-forward current ($i_{FF}$) using the VIN/N V2I converter 666 (710).

Finally, information on $V_{IN}$ is extracted from the $i_{FF}$ using the turn-ratio cancellation and FF signal generation circuit 668, and FF signals 670 generated for use by the secondary side controller 602 to control the converter 600 in FF mode (712).

Thus, an AC-DC converter with a transformer, secondary side control, and SR architecture, and methods for operating the same have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. An integrated circuit (IC) controller comprising:
   a synchronous rectifier sense (SR-SNS) pin to sense a voltage at a synchronous rectifier (SR) on a secondary side of an alternating current-direct current (AC-DC) converter;
   a voltage bus (VBUS_IN) pin to sense an output bus voltage on the secondary side of the AC-DC converter;
   a first voltage-to-current converter coupled to the VBUS_IN pin and to the SR-SNS pin to remove a component of the output bus voltage from the voltage sensed on the SR-SNS pin;
   a sample and hold (S/H) circuit coupled to sample the voltage sensed on the SR-SNS pin and to provide a sampled voltage;
   a second voltage-to-current converter coupled to the S/H circuit to receive the sampled voltage and to convert the sampled voltage to a feed-forward current; and
   a signal generation circuit coupled to the second voltage-to-current converter to receive the feed-forward current and to generate feed-forward signals used to control operation of a primary side of the AC-DC converter.

2. The IC controller of claim 1, further comprising an internal resistive element coupled between the SR-SNS pin and an internal rectifier.

3. The IC controller of claim 2, wherein the internal rectifier is configured to prevent voltage division when the voltage sensed on SR-SNS pin is close to ground level.

4. The IC controller of claim 1, wherein the first voltage-to-current converter is configured to sink a current drawn through the SR-SNS pin.

5. The IC controller of claim 4, wherein the first voltage-to-current converter is a temperature compensated circuit configured so that the current being sunk is constant across temperature.

6. The IC controller of claim 1, wherein the first voltage-to-current converter is coupled to the SR-SNS pin through the second voltage-to-current converter.

7. The IC controller of claim 1, wherein the S/H circuit comprises a S/H capacitor having a first terminal coupled to the SR-SNS pin and a second terminal coupled to a signal ground in the IC controller.

8. The IC controller of claim 1, wherein the feed-forward signals include one or more of a feed-forward current signal, a feed-forward voltage signal, a feed-forward over-voltage signal, and a feed-forward under-voltage signal.

9. The IC controller of claim 1, wherein the IC controller is configured to control the AC-DC converter to provide a DC output voltage compatible with a Universal Serial Bus Type-C (USB-C) standard.

10. An alternating current-direct current (AC-DC) converter, wherein the AC-DC converter comprises:
    a transformer coupled between a primary side and a secondary side of the AC-DC converter, wherein the primary side is to receive a rectified AC input and the secondary side is to provide a DC output, and wherein the secondary side includes a synchronous rectifier (SR); and
    a secondary side integrated circuit (IC) controller comprising:
       a synchronous rectifier sense (SR-SNS) pin to sense a voltage at the SR;
       a voltage bus (VBUS_IN) pin to sense an output bus voltage on the secondary side of the AC-DC converter;
       a first voltage-to-current converter coupled to the VBUS_IN pin and to the SR-SNS pin to remove a component of the output bus voltage from the voltage sensed on the SR-SNS pin;
       a sample and hold (S/H) circuit coupled to sample the voltage sensed on the SR-SNS pin and to provide a sampled voltage;
       a second voltage-to-current converter coupled to the S/H circuit to receive the sampled voltage and to convert the sampled voltage to a feed-forward current; and
       a signal generation circuit coupled to the second voltage-to-current converter to receive the feed-forward current and to generate feed-forward signals that are used by the secondary side IC controller to control operation of the primary side of the AC-DC converter.

11. The AC-DC converter of claim 10, further comprising a voltage divider comprising an external resistive element and an internal resistive element, wherein the external resistive element is coupled between the SR-SNS pin and the SR, and wherein the internal restive element is coupled within the secondary side IC controller between the SR-SNS pin and an internal rectifier.

12. The AC-DC converter of claim 11, wherein the external resistive element has a resistance in a range between 4KΩ and 10KΩ.

13. The AC-DC converter of claim 10, wherein the first voltage-to-current converter is configured to sink a current drawn through the SR-SNS pin.

14. The AC-DC converter of claim 10, wherein the first voltage-to-current converter is coupled to the SR-SNS pin through the second voltage-to-current converter.

15. The AC-DC converter of claim 10, wherein the S/H circuit comprises a S/H capacitor having a first terminal coupled to the SR-SNS pin and a second terminal coupled to a signal ground in the IC controller.

16. The AC-DC converter of claim 10, wherein the feed-forward signals include one or more of a feed-forward current signal, a feed-forward voltage signal, a feed-forward over-voltage signal, and a feed-forward under-voltage signal.

17. The AC-DC converter of claim 10, further comprising a connector compatible with a Universal Serial Bus Type-C (USB-C) standard, wherein the connector is coupled to the DC output.

18. A method of operating a secondary side integrated circuit (IC) controller for an alternating current-direct current (AC-DC) converter, the method comprising:
    sensing, at a synchronous rectifier sense (SR-SNS) pin of the secondary side IC controller, a voltage at a synchronous rectifier (SR) on a secondary side of the AC-DC converter;
    receiving, at a voltage bus (VBUS_IN) pin of the secondary side IC controller, an output bus voltage on the secondary side of the AC-DC converter;
    removing, by a first voltage-to-current converter of the secondary side IC controller, a component of the output bus voltage from the voltage sensed on the SR-SNS pin;
    sampling the voltage sensed on the SR-SNS pin and providing a sampled voltage;
    converting, by a second voltage-to-current converter of the secondary side IC controller, the sampled voltage to a feed-forward current;

generating, by a signal generation circuit of the secondary side IC controller, feed-forward signals based on the feed-forward current; and using the feed-forward signals to control operation of a primary side of the AC-DC converter.

19. The method of claim 18, further comprising determining, by a line-feed-forward (LFF) block in the secondary side IC controller, whether the AC-DC converter is operating in a LFF sensing mode.

20. The method of claim 19, further comprising sensing the voltage applied on the SR-SNS pin without voltage division, when the AC-DC converter is determined to be operating in the LFF sensing mode.

* * * * *